United States Patent
Chen et al.

(10) Patent No.: US 7,886,127 B2
(45) Date of Patent: *Feb. 8, 2011

(54) METHODS FOR ACCESSING MULTIPLE PAGE TABLES IN A COMPUTER SYSTEM

(75) Inventors: Xiaoxin Chen, Fremont, CA (US); Alberto J. Munoz, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/345,866

(22) Filed: Dec. 30, 2008

(65) Prior Publication Data

US 2009/0106524 A1 Apr. 23, 2009

Related U.S. Application Data

(63) Continuation of application No. 11/521,632, filed on Sep. 14, 2006, now Pat. No. 7,490,216, which is a continuation of application No. 10/397,030, filed on Mar. 25, 2003, now Pat. No. 7,111,145.

(51) Int. Cl.
*G06F 12/08* (2006.01)
*G06F 12/10* (2006.01)

(52) U.S. Cl. .................. 711/206; 711/202; 711/203; 711/205; 711/207; 711/E12.016

(58) Field of Classification Search .......... 711/6, 711/202–203, 205–207, E12.016
See application file for complete search history.

(56) References Cited

U.S. PATENT DOCUMENTS

| 6,075,938 | A | 6/2000 | Bugnion et al. |
| 6,606,697 | B1 | 8/2003 | Kawahara et al. |
| 6,651,132 | B1 | 11/2003 | Traut |
| 6,698,017 | B1 | 2/2004 | Adamovits et al. |
| 6,725,289 | B1 | 4/2004 | Waldspurger et al. |
| 2003/0115578 | A1 | 6/2003 | Liokumovich et al. |
| 2003/0120856 | A1 | 6/2003 | Neiger et al. |

(Continued)

OTHER PUBLICATIONS

Office Action dated May 18, 2005 in U.S. Appl. No. 10/397,030.

(Continued)

*Primary Examiner*—Jasmine Song
(74) *Attorney, Agent, or Firm*—Darryl A. Smith

(57) ABSTRACT

A virtual memory system implementing the invention provides concurrent access to translations for virtual addresses from multiple address spaces. One embodiment of the invention is implemented in a virtual computer system, in which a virtual machine monitor supports a virtual machine. In this embodiment, the invention provides concurrent access to translations for virtual addresses from the respective address spaces of both the virtual machine monitor and the virtual machine. Multiple page tables contain the translations for the multiple address spaces. Information about an operating state of the computer system, as well as an address space identifier, are used to determine whether, and under what circumstances, an attempted memory access is permissible. If the attempted memory access is permissible, the address space identifier is also used to determine which of the multiple page tables contains the translation for the attempted memory access.

42 Claims, 11 Drawing Sheets

U.S. PATENT DOCUMENTS

2004/0010787 A1    1/2004    Traut et al.
2004/0117593 A1    6/2004    Uhlig et al.

OTHER PUBLICATIONS

Response to Office Action dated Oct. 14, 2005 in U.S. Appl. No. 10/397,030.

Final Office Action dated Jan. 12, 2006 in U.S. Appl. No. 10/397,030.

Response to Final Office Action dated Jul. 7, 2006 in U.S. Appl. No. 10/397,030.

Office Action dated Dec. 12, 2007 in U.S. Appl. No. 11/521,632.

Response to Office Action dated Jun. 10, 2008 in U.S. Appl. No. 11/521,632.

Theimer, Marvin M. et al., "Preemptable Remote Execution Facilities for the V-System", Computer Science Department, Stanford University, Stanford, CA 1985.

| VRN \ EXEC MODE | MONITOR | BINARY TRANSLATION | DIRECT EXECUTION |
|---|---|---|---|
| VMMVRN | MONITOR PAGE TABLE | MONITOR PAGE TABLE | REGION SWITCH |
| !VMMVRN | ILLEGAL ACCESS | GUEST PAGE TABLE | GUEST PAGE TABLE |

METHODS FOR ACCESSING MULTIPLE PAGE TABLES IN A COMPUTER SYSTEM

CROSS-REFERENCE TO RELATED APPLICATIONS

This application is a Continuation of U.S. patent application Ser. No. 11/521,632, filed 14 Sep. 2006, now issued as U.S. Pat. No. 7,490,216; which is a Continuation of U.S. patent application Ser. No. 10/397,030, filed 25 Mar. 2003, now issued as U.S. Pat. No. 7,111,145.

BACKGROUND OF THE INVENTION

1. Field of the Invention

This invention relates to the field of virtual memory systems in a computer system.

2. Description of the Related Art

The preferred embodiment of the invention is described relative to a virtual memory system for a virtual computer system. Consequently, this description begins with an introduction to virtual computing and virtual memory systems.

Virtualization has brought many advantages to the world of computers. As is well known in the art, a virtual machine (VM) is a software abstraction—a "virtualization"—of an actual physical computer system that runs as a "guest" on an underlying "host" hardware platform. As long as a suitable interface is provided between the VM and the host platform, one advantage is that the operating system (OS) in the guest need not be the same as the OS at the system level in the host. For example, applications that presuppose a Microsoft Windows OS can be run in the VM even though the OS used to handle actual I/O, memory management, etc., on the host might be Linux.

It usually requires less than 10% of the processing capacity of a CPU to run a typical application, although usage may peak briefly for certain operations. Virtualization can more efficiently use processing capacity by allowing more than one VM to run on a single host, effectively multiplying the number of "computers" per "box." Depending on the implementation, the reduction in performance is negligible, or at least not enough to justify separate, dedicated hardware "boxes" for each user.

Still another advantage is that different VMs can be isolated from and completely transparent to one another. Indeed, the user of a single VM will normally be unaware that he is not using a "real" computer, that is, a system with hardware dedicated exclusively to his use. The existence of the underlying host will also be transparent to the VM software itself. The products of VMware, Inc., of Palo Alto, Calif. provide all of these advantages in that they allow multiple, isolated VMs, which may (but need not) have OSs different from each other's, to run on a common hardware platform.

Example of a Virtualized System

FIG. 1 illustrates the main components of a system that supports a virtual machine as implemented in the Workstation product of VMware, Inc. As in conventional computer systems, both system hardware 100 and system software 200 are included. The system hardware 100 includes CPU(s) 102, which may be a single processor, or two or more cooperating processors in a known multiprocessor arrangement. The system hardware also includes system memory 104, one or more disks 106, and some form of memory management unit MMU 108. As is well understood in the field of computer engineering, the system hardware also includes, or is connected to, conventional registers, interrupt-handling circuitry, a clock, etc., which, for the sake of simplicity, are not shown in the figure.

The system software 200 either is or at least includes an operating system OS 220, which has drivers 240 as needed for controlling and communicating with various devices 110, and usually with the disk 106 as well. Conventional applications 260, if included, may be installed to run on the hardware 100 via the system software 200 and any drivers needed to enable communication with devices.

As mentioned above, the virtual machine (VM) 300—also known as a "virtual computer"—is a software implementation of a complete computer system. In the VM, the physical system components of a "real" computer are emulated in software, that is, they are virtualized. Thus, the VM 300 will typically include virtualized ("guest") system hardware 301, which in turn includes one or more virtual CPUs 302 (VCPU), virtual system memory 304 (VMEM), one or more virtual disks 306 (VDISK), and one or more virtual devices 310 (VDEVICE), all of which are implemented in software to emulate the corresponding components of an actual computer.

The VM's system software 312 includes a guest operating system 320, which may, but need not, simply be a copy of a conventional, commodity OS, as well as drivers 340 (DRVS) as needed, for example, to control the virtual device(s) 310. Of course, most computers are intended to run various applications, and a VM is usually no exception. Consequently, by way of example, FIG. 1 illustrates one or more applications 360 installed to run on the guest OS 320; any number of applications, including none at all, may be loaded for running on the guest OS, limited only by the requirements of the VM.

Note that although the hardware "layer" 301 will be a software abstraction of physical components, the VM's system software 312 may be the same as would be loaded into a hardware computer. The modifier "guest" is used here to indicate that the VM, although it acts as a "real" computer from the perspective of a user, is actually just computer code that is executed on the underlying "host" hardware and software platform 100, 200. Thus, for example, I/O to the virtual device 310 will actually be carried out by I/O to the hardware device 110, but in a manner transparent to the VM.

If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. FIG. 1 illustrates a single VM 300 merely for the sake of simplicity; in many installations, there will be more than one VM installed to run on the common hardware platform; all will have essentially the same general structure, although the individual components need not be identical.

Some interface is usually required between the VM 300 and the underlying "host" hardware 100, which is responsible for actually executing VM-related instructions and transferring data to and from the actual, physical memory 104. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 54-45.

A VMM is usually a relatively thin layer of software that runs directly on top of a host, such as the system software 200, or directly on the hardware, and virtualizes the resources of the (or some) hardware platform. The VMM will typically include at least one device emulator 410, which may also form the implementation of the virtual device 310. The interface exported to the respective VM is usually such that the guest OS 320 cannot determine the presence of the VMM. The VMM also usually tracks and either forwards (to the host OS 220) or itself schedules and handles all requests by its VM for machine resources, as well as various faults and interrupts. FIG. 1 therefore illustrates an interrupt (including fault) handler 450 within the VMM. The general features of VMMs are well known and are therefore not discussed in further detail here.

In FIG. 1, a single VMM 400 is shown acting as the interface for the single VM 300. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In some configurations, the VMM 400 runs as a software layer between the host system software 200 and the VM 300. In other configurations, such as the one illustrated in FIG. 1, the VMM runs directly on the hardware platform 100 at the same system level as the host OS. In such case, the VMM may use the host OS to perform certain functions, including I/O, by calling (usually through a host API—application program interface) the host drivers 240. In this situation, it is still possible to view the VMM as an additional software layer inserted between the hardware 100 and the guest OS 320. Furthermore, it may in some cases be beneficial to deploy VMMs on top of a thin software layer, a "kernel," constructed specifically for this purpose.

FIG. 2 illustrates yet another implementation, in which the kernel 700 takes the place of and performs the conventional functions of the host OS. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 220 of the underlying physical computer, or whatever system-level software handles actual I/O operations, takes faults and interrupts, etc. for the VM. The invention may be used in all the different configurations described above.

Memory Mapping and Address Terminology

In most modern computers, memory is addressed as units known as "pages," each of which is identified by a corresponding page number. The most straightforward way for all components in a computer to uniquely identify a memory page would be for them all simply to use a common set of page numbers. This is almost never done, however, for many well-known reasons. Instead, user-level software normally refers to memory pages using one set of identifiers, which is then ultimately mapped to the set actually used by the underlying hardware memory.

When a subsystem requests access to the hardware memory 104, for example, the request is usually issued with a "virtual address," since the memory space that the subsystem addresses is a construct adopted to allow for much greater generality and flexibility. The request must, however, ultimately be mapped to an address that is issued to the actual hardware memory. This mapping, or translation, is typically specified by the operating system (OS), which includes some form of memory management module 245 included for this purpose. The OS thus converts the "virtual" address (VA), in particular, the virtual page number (VPN) of the request, into a "physical" address (PA), in particular, a physical page number (PPN), that can be applied directly to the hardware. (The VA and PA have a common offset from a base address, so that only the VPN needs to be converted into a corresponding PPN.)

When writing a given word to a virtual address in memory, the processor breaks the virtual address into a page number (higher-order address bits) plus an offset into that page (lower-order address bits). The virtual page number (VPN) is then translated using mappings established by the OS into a physical page number (PPN) based on a page table entry (PTE) for that VPN in the page table associated with the currently active address space. The page table will therefore generally include an entry for every VPN. The actual translation may be accomplished simply by replacing the VPN (the higher order bits of the virtual address) with its PPN mapping, leaving the lower order offset bits the same.

To speed up virtual-to-physical address translation, a hardware structure known as a translation look-aside buffer (TLB) is normally included, for example, as part of a hardware memory management unit (MMU) 108. The TLB contains, among other information, VA-to-PA mapping entries at least for VPNs that have been addressed recently or frequently. Rather than searching the entire page table, the TLB is searched first instead. If the current VPN is not found in the TLB, then a "TLB miss" occurs, and the page tables in memory are consulted to find the proper translation, and the TLB is updated to include this translation. The OS thus specifies the mapping, but the hardware MMU 108 usually actually performs the conversion of one type of page number to the other. Below, for the sake of simplicity, when it is stated that a software module "maps" page numbers, the existence and operation of a hardware device such as the MMU 108 may be assumed.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Patterson and Hennessy analogize address translation to finding a book in a library. The VPN is the "title" of the book and the full card catalog is the page table. A catalog card is included for every book in the library and tells the searcher where the book can be found. The TLB is then the "scratch" paper on which the searcher writes down the locations of the specific books he has previously looked up.

An extra level of addressing indirection is typically implemented in virtualized systems in that a VPN issued by an application 360 in the VM 300 is remapped twice in order to determine which page of the hardware memory is intended. A mapping module 345 within the guest OS 320 translates the guest VPN (GVPN) into a corresponding guest PPN (GPPN) in the conventional manner. The guest OS therefore "believes" that it is directly addressing the actual hardware memory, but in fact it is not. Of course, a valid address to the actual hardware memory address must, however, ultimately be used.

An address mapping module 445 in the VMM 400 therefore takes the GPPN issued by the guest OS 320 and maps it to a hardware page number PPN that can be used to address the hardware memory. From the perspective of the guest OS, the GVPN and GPPN are virtual and physical page numbers just as they would be if the guest OS were the only OS in the system. From the perspective of the actual host OS, however, the GPPN is a page number in the virtual address space, that is, a VPN, which is then mapped into the physical memory space of the hardware memory as a PPN. Note that in some literature involving virtualized systems, GVPNs, GPPNs, VPNs and PPNs are sometimes referred to as "VPNs," "PPNs," "VPNs" and "PPNs," respectively, where "PPN" means "machine page number," that is, the page number used to address the hardware memory. The problem is, though, that "VPN" is then used to mean the virtual page number in both the guest and host contexts, and one must always be aware of the current context to avoid confusion. Regardless of notation, however, the intermediate GPPN→PPN mapping performed by the VMM is transparent to the guest system, and the host OS need not maintain a GVPN→GPPN mapping.

Speed is a critical issue in virtualization—a VM that perfectly emulates the functions of a given computer but that is too slow to perform needed tasks is obviously of little good to a user. Ideally, a VM should operate at the native speed of the underlying host system. In practice, even where only a single VM is installed on the host, it is impossible to run a VM at native speed, if for no other reason than that the instructions that define the VMM must also be executed. Near native speed, is possible, however, in many common applications.

The highest speed for a VM is found in the special case where every VM instruction executes directly on the hardware processor. This would in general not be a good idea, however, because the VM should not be allowed to operate at the greatest privilege level; otherwise, it might alter the instructions or data of the host OS or the VMM itself and cause unpredictable behavior. Moreover, in cross-architectural systems, one or more instructions issued by the VM may not be included in the instruction set of the host processor. Instructions that cannot (or must not) execute directly on the host are typically converted into an instruction stream that can. This conversion process is commonly known as "binary translation."

U.S. Pat. No. 6,397,242 (Devine, et al., "Virtualization system including a virtual machine monitor for a computer with a segmented architecture"), which is incorporated herein by reference, describes a system in which the VMM includes a mechanism that allows VM instructions to execute directly on the hardware platform whenever possible, but that switches to binary translation when necessary. This allows for the speed of direct execution combined with the security of binary translation.

A virtualization system of course involves more than executing VM instructions—the VMM itself is also a software mechanism defined by instructions and data of its own. For example, the VMM might be a program written in C, compiled to execute on the system hardware platform. At the same time, an application 360 written in a language such as Visual Basic might be running in the VM, whose guest OS may be compiled from a different language.

There must also be some way for the VM to access hardware devices, albeit in a manner transparent to the VM itself. One solution would of course be to include in the VMM all the required drivers and functionality normally found in the host OS 220 to accomplish I/O tasks. Two disadvantages of this solution are increased VMM complexity and duplicated effort—if a new device is added, then its driver would need to be loaded into both the host OS and the VMM. In systems that include a host OS (as opposed to a dedicated kernel such as shown in FIG. 2), a much more efficient method has been implemented by VMware, Inc., in its Workstation product. This method is also illustrated in FIG. 1.

In the system illustrated in FIG. 1, both the host OS and the VMM are installed at system level, meaning that they both run at the greatest privilege level and can therefore independently modify the state of the hardware processor(s). For I/O to at least some devices, however, the VMM may issue requests via the host OS 220. To make this possible, a special driver VMdrv 242 is installed as any other driver within the host OS 220 and exposes a standard API to a user-level application VMapp 500. When the system is in the VMM context, meaning that the VMM is taking exceptions, handling interrupts, etc., but the VMM wishes to use the existing I/O facilities of the host OS, the VMM calls the driver VMdrv 242, which then issues calls to the application VMapp 500, which then carries out the I/O request by calling the appropriate routine in the host OS.

In FIG. 1, the vertical line 600 symbolizes the boundary between the virtualized (VM/VMM) and non-virtualized (host software) "worlds" or "contexts." The driver VMdrv 242 and application VMapp 500 thus enable communication between the worlds even though the virtualized world is essentially transparent to the host system software 200.

FIG. 3 illustrates how the VMM and VM access memory from the perspective of the host OS. Note that the host OS will view the VMM and VM as applications and thus considers their addresses both to be "virtual," which are converted into "physical" addresses, following conventional terminology. As is mentioned above, virtualization introduces an additional level of addressing indirection, such that the "physical" addresses (GPAs) issued by the VM guest must be converted into hardware addresses (PAs). In virtualized systems in which the VMM is at the same system level as the host OS, the VMM itself can perform virtual-to-physical address translation or address directly the hardware structures, such as the TLB, used to translate addresses.

As FIG. 3 shows, when an instruction in the monitor virtual address space accesses guest memory, the hardware must get the physical (hardware) address for the instruction and the physical (hardware) address of the guest memory. This is accomplished by translating the monitor and guest virtual addresses into their corresponding physical addresses. Thus, the hardware must have concurrent access to translations from two distinct address spaces. The hardware TLB may contain both types of translations, but all the required translations generally won't fit in the TLB at the same time. If a translation is not found in the TLB, the hardware may provide a page table walker that can look for the required translation in a designated page table. However, a single page table typically only contains address translations for a single address space, and the computer hardware typically only provides the capability of searching a single page table.

What is needed therefore is a mechanism for providing concurrent access to all necessary translations for virtual addresses in multiple distinct address spaces. Depending on the circumstances, access to such a mechanism may be needed relatively often. What is therefore needed in particular is such a mechanism that is also relatively efficient. This invention provides such a mechanism.

SUMMARY OF THE INVENTION

The invention relates to a computer system having multiple address spaces, and provides concurrent access to the multiple address spaces. The invention provides a plurality of page tables containing translations for virtual addresses in the multiple address spaces. Each page table contains translations for one or more address spaces, and the translations for each address space are contained in a single page table. The invention uses an address space identifier to determine the address space to which an attempted memory access relates, and attempts to obtain the required address translation from the corresponding page table.

A first general embodiment of the invention is implemented in a virtual computer system comprising a system hardware, a virtual machine monitor and a virtual machine. This embodiment of the invention is a method that provides concurrent access to address translations for multiple virtual address spaces. The method comprises providing a first page table having address translations from a first virtual address space to a physical address space, the first virtual address space being used by software within the virtual machine monitor; providing a second page table having address translations from a second virtual address space to the physical address space, the second virtual address space being used by software within the virtual machine; and, in response to an attempted memory access, determining whether a virtual address for the attempted memory access is in the first virtual address space or the second virtual address space by referencing an address space identifier. If the virtual address is in the first virtual address space, the method causes the system hardware to use the first page table to determine a translation for the virtual address, or, if the virtual address is in the second virtual address space, the method causes the system hardware to use the second page table to determine a translation for the virtual address.

The first general embodiment encompasses a number of more specific embodiments. In one such embodiment, the address space identifier comprises one or more bits of the virtual address. In another embodiment, the address space identifier specifies a region number. In another embodiment, the steps of determining whether a virtual address for the attempted memory access is in the first virtual address space or the second virtual address space by referencing an address space identifier and causing the system hardware to use either the first page table or the second page table to determine a translation for the virtual address are further in response to a TLB Miss fault. In another embodiment, the method further comprises providing a TLB which is checked for an address translation for the attempted memory access prior to any TLB Miss fault, and inserting address translations for both the first and the second virtual address spaces into the TLB. In another embodiment, the method further comprises providing a page table walker and configuring the page table walker to check the second page table for an address translation for the attempted memory access prior to any TLB Miss fault. In another embodiment, the method is performed within a single context in a TLB Miss fault handler.

A second general embodiment of the invention is implemented in a computer system executing a computer program that accesses both a first virtual address space and a second virtual address space. This embodiment of the invention is a method for obtaining an address translation for an attempted memory access. The method comprises obtaining an address space identifier which indicates whether the attempted memory access is to the first virtual address space or the second virtual address space, wherein the computer system has a first page table containing address translations from the first virtual address space to a physical address space and a second page table containing address translations from the second virtual address space to the physical address space. If the attempted memory access is to the first virtual address space, the method obtains the address translation from the first page table, or, if the attempted memory access is to the second virtual address space, the method obtains the address translation from the second page table.

The second general embodiment also encompasses a number of more specific embodiments. In one such embodiment, the address space identifier comprises one or more bits of the virtual address for the attempted memory access. In another embodiment, the address space identifier specifies a region number. In another embodiment, the steps of obtaining an address space identifier which indicates whether the attempted memory access is to the first virtual address space or the second virtual address space and obtaining the address translation from either the first page table or the second page table are in response to a TLB Miss fault. In another embodiment, the method further comprises providing a TLB which is checked for an address translation for the attempted memory access prior to any TLB Miss fault, and inserting address translations for both the first and the second virtual address spaces into the TLB. In another embodiment, the method further comprises providing a page table walker and configuring the page table walker to check the second page table for an address translation for the attempted memory access prior to any TLB Miss fault. In another embodiment, the method is performed within a single context in a TLB Miss fault handler. In another embodiment, the computer system is a virtual computer system comprising a virtual machine monitor having the first virtual address space and a virtual machine having the second virtual address space.

DETAILED DESCRIPTION

Figure 1:
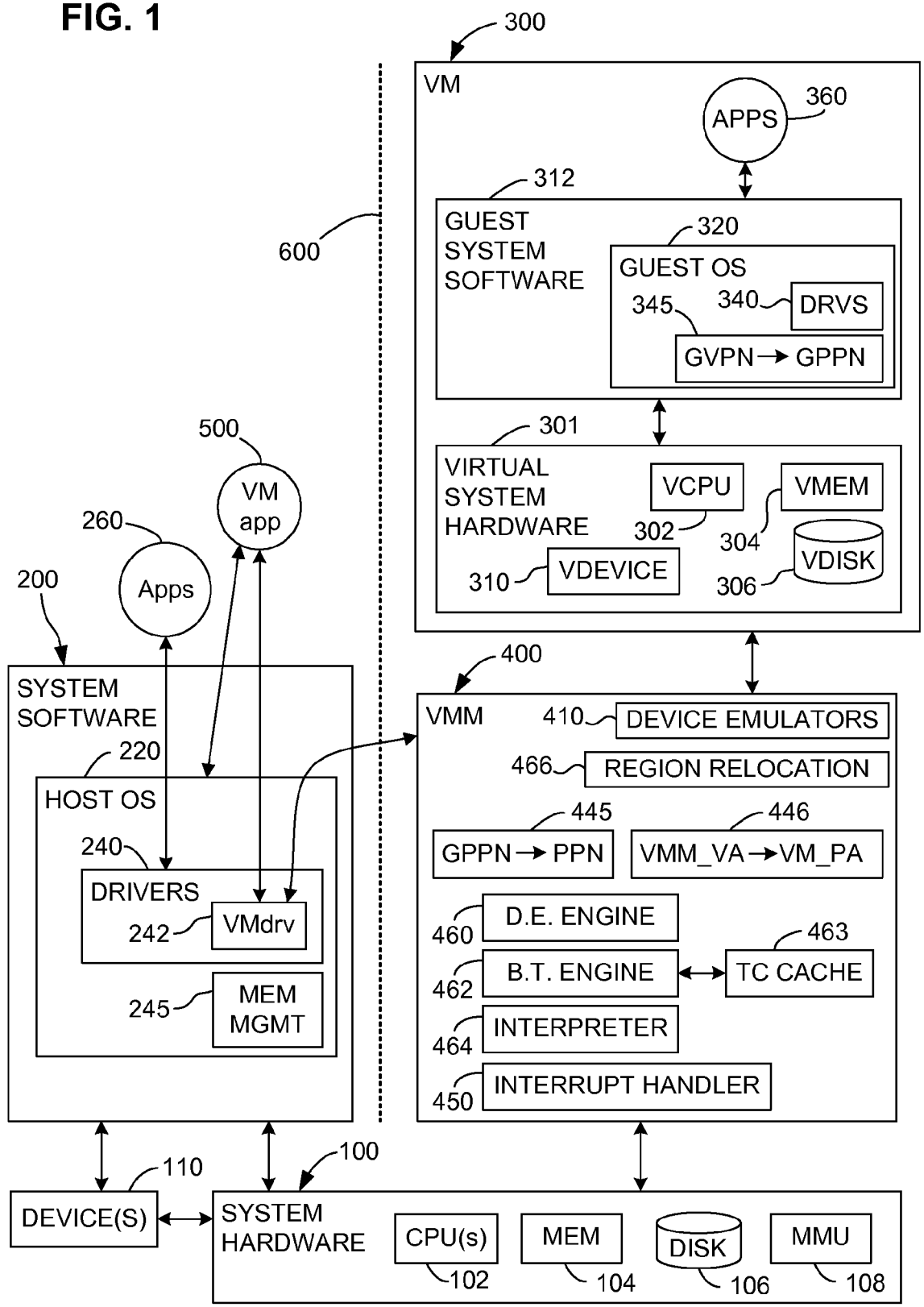
FIG. 1 illustrates a virtual computer system installed on a host platform, with a virtual machine monitor (VMM) at the same system level as the host operating system.
Figure 2:
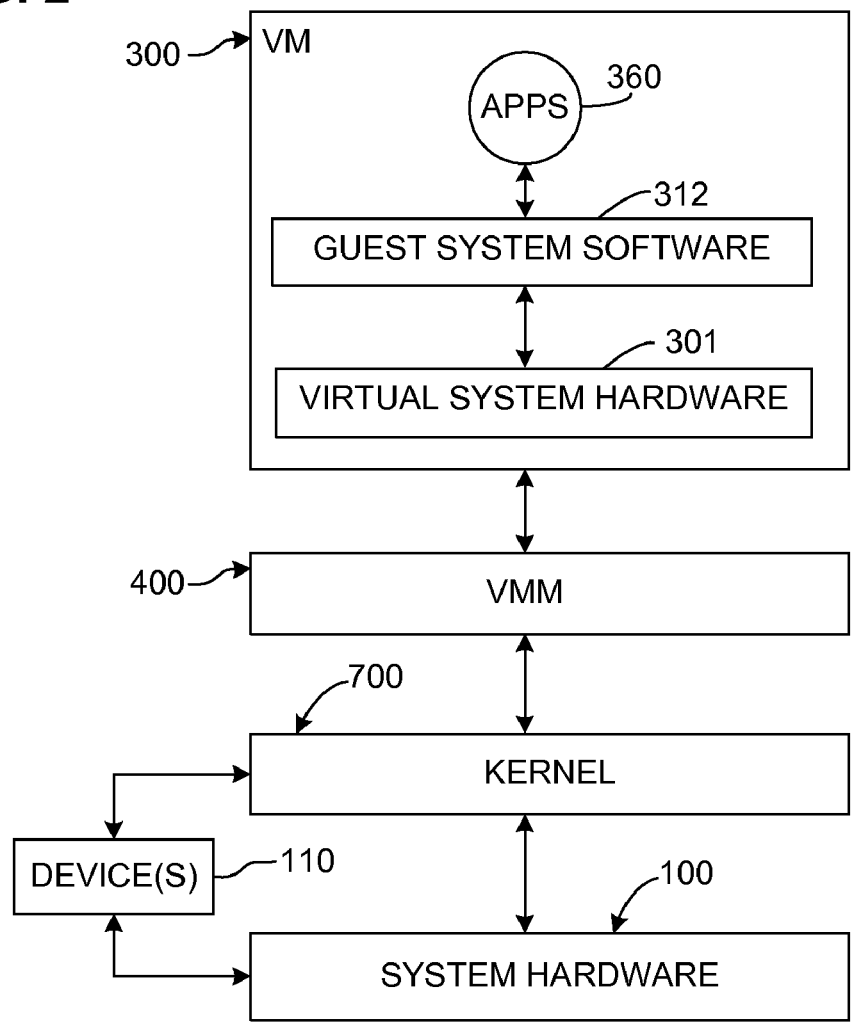
FIG. 2 illustrates an alternative configuration of a virtual computer system, which includes a kernel on which the VMM runs.
Figure 3:
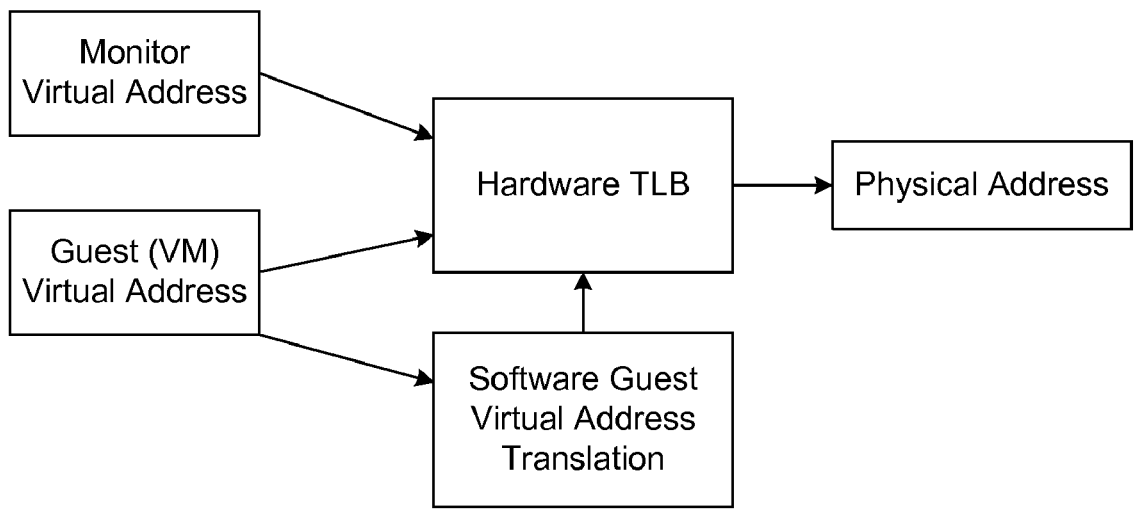
FIG. 3 illustrates memory access by a virtual machine (VM) and VMM.

In broad terms, the invention relates to a TLB Miss fault handler for a computer system having a virtual memory system in which translations for virtual addresses in multiple address spaces are available concurrently. The invention uses multiple page tables to retain the translations for the multiple address spaces, and an address space identifier is used to determine which of the multiple page tables contains a particular virtual address translation. In some embodiments of the invention, the permissibility of an attempted memory access is based on a differentiation between various states of the computer system. For example, in some embodiments of the invention, a computer system may have multiple "execution modes," and the current execution mode is used to determine whether an attempted access, using a particular page table, is permissible. Other means for differentiating between multiple states of operation of the computer system are also possible. Based on the current operating state of the computer system and the address space identifier, a determination is made as to whether, and/or under what circumstances, an attempted access is permissible. If the attempted access is permissible, then the address space identifier is used to determine the page table to be used for the required address translation.

The preferred embodiment is described in terms of a virtual computer system, in which a VMM executes on an Intel IA-64 physical hardware system to support a virtual computer also having the Intel IA-64 architecture. However, the invention may also be implemented in a wide variety of other computer systems, including systems implementing a wide variety of other virtual computer systems, as well as systems that do not implement any virtual computer system. In the preferred embodiment, a virtual region number (VRN) in the IA-64 architecture is used as an address space identifier.

Also, as described elsewhere in this application, the VMM of the preferred embodiment supports the VM, causing guest instructions to be executed, using both direct execution and binary translation. When guest instructions are being directly executed on the system hardware, the VMM is described as being in a "direct execution mode." When translated instructions are being executed, the VMM is described as being in a "binary translation mode" or a "translation cache mode." When the VMM is active and an interrupt handler routine is executing, the VMM is described as being in an "interrupt handler mode." When the VMM is active, but it is not in the direct execution mode, the binary translation mode, nor the interrupt handler mode, then the VMM is described as being in a "monitor mode." The direct execution mode, the binary translation mode, the interrupt handler mode and the monitor mode are referred to as "execution modes."

In the preferred execution mode, the VRN is used, along with the current execution mode, to determine whether an attempted memory access is permissible. If the attempted access is permissible, the VRN is also used to determine which of two page tables is searched for a translation for an attempted memory access that gave rise to a TLB Miss fault. In the preferred embodiment, handling a TLB Miss fault, including determining the permissibility of an attempted access, determining the appropriate page table, finding the required translation and inserting the translation into the TLB, can generally be accomplished without a context switch.

IA-64 Memory Architecture

To better explain the preferred embodiment of the invention, a brief description is provided of the main addressing conventions of the Intel IA-64 architecture. One distinction between this architecture and the 32-bit, IA-32 architecture is that the IA-64 memory space is non-segmented, but is divided into regions. Note that the term "segment" is also used in descriptions of the Intel IA-64, but not in the same sense as in segmented architectures. In a segmented memory architecture such as the IA-32, memory access is controlled using segment registers and various tables of segment "descriptors" that may be loaded into the registers. The main tables are the Local Descriptor Table (LDT) and the Global Descriptor Table (GDT). A VM running on this architecture will maintain similar tables for its virtual processor; thus, the VM will have a virtual LDT and a virtual GDT. The VMM may maintain shadow copies of these virtual descriptor tables to help ensure coherency and to increase security. Segmentation in the IA-32 (or earlier) context is thus related to hardware segment registers.

The Intel "IA-64 Software Conventions and Runtime Architecture Guide," September 2000, defines the difference between segments and regions in the IA-64 context:

Segment: An area of memory that has specific attributes and behaves as a fixed unit at runtime. All items within a segment have a fixed address relationship to one another at execution time, and have a common set of attributes. Items in different segments do not necessarily bear this relationship, and an application may not depend on one . . . The use of this term is not related to the concept of a segment in the IA-32 architecture, nor is it directly related to the concept of a segment in an object file.

Region: The IA-64 architecture divides the address space into four or eight regions. In general, the runtime architecture is independent of which segments are assigned to which regions.

The IA-64 system has the property that it can map virtual memory regions differently, and can change the mapping, but the mapping granularity is always a whole region.

By definition, if addresses are 64 bits wide, then there are $2^{64}$ possible addresses, which comprise the entire theoretical virtual address space of the memory. Actually, using the region registers described below, there are $2^{24}$ different regions, with each region having $2^{61}$ possible addresses. However, only $2^{64}$ addresses may be used at any time. No hardware memory could ever hold even $2^{64}$ bytes (words, etc.), however, so the host OS and/or hardware memory management mechanisms map whatever subset of the $2^{64}$ possible memory addresses that is allocated for use by applications to physical memory.

Figure 4:
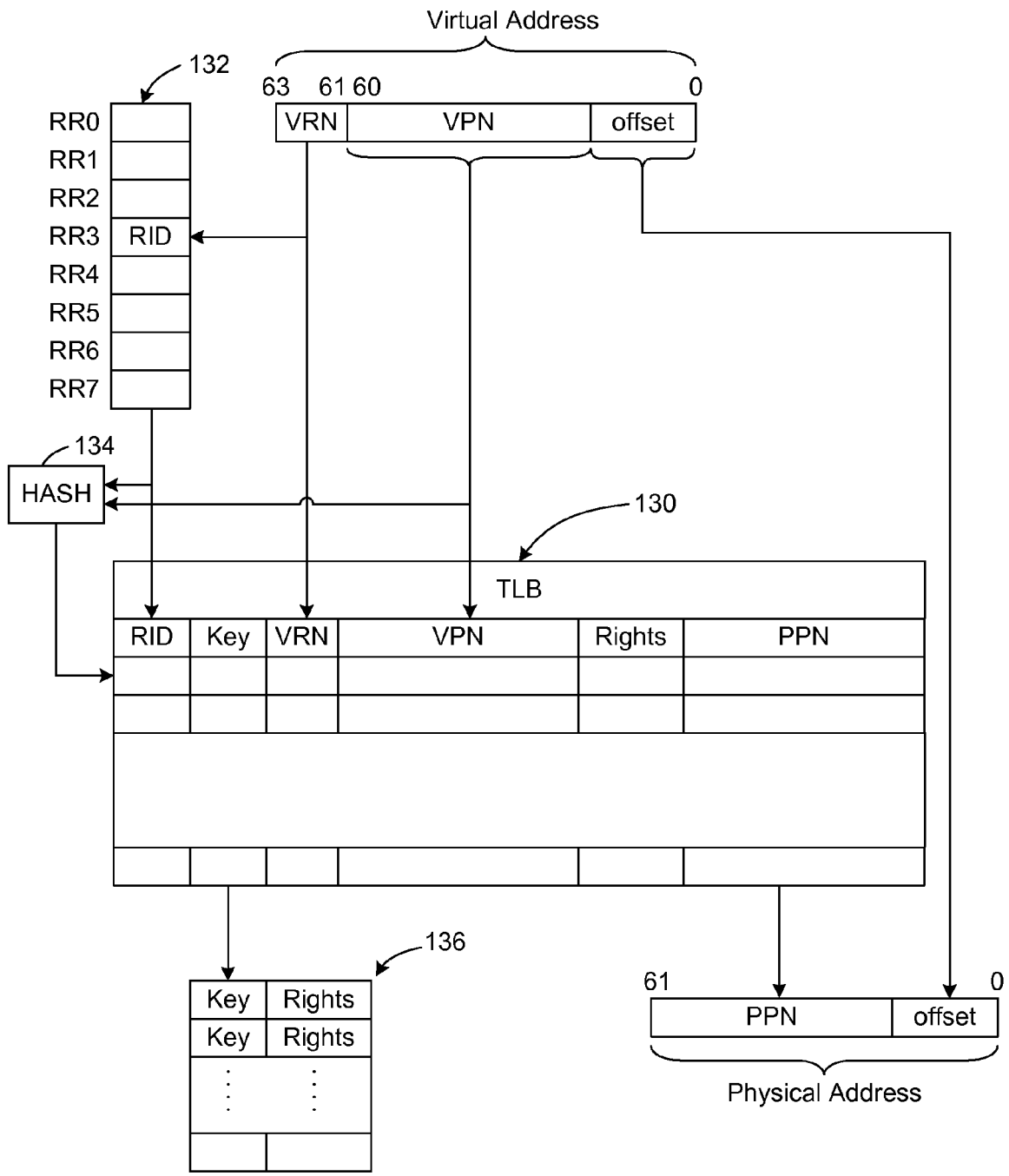
FIG. 4 illustrates various structures used to translate virtual addresses into physical addresses in the Intel IA-64 architecture.

FIG. 4, which is adapted from Intel Corp.'s "IA-64 Architecture Software Developer's Manual," Vol. 2, "Addressing and Protection," Rev. 1.0, January 2000, illustrates how virtual addresses are translated into physical addresses in a standard IA-64 system: Each virtual address includes a virtual region number (VRN), indicated using the three MSBs of the address, a virtual page number (VPN) and an offset. The VRN is used both to search a corresponding field in the entries of a translation lookaside buffer (TLB) 130 and also to point into a set (RR0, RR1, . . . , RR7) of region registers 132, each of which contains a 24-bit region identifier (RID).

To translate a virtual address into a physical address, the TLB 130 matches both the RID obtained from the RR of the VRN and the VPN with entries in the TLB. If a matching entry is found, the entry's physical page number (PPN) is concatenated with the page offset of the virtual address to form the physical address. Besides fields used for virtual address translation, the TLB entry also contains access rights and a 24-bit protection key, which is matched against all protection key registers 136. The memory address translation succeeds only if both the access rights from the TLB entry allow the access and a matching protection key is found with the required permission bits set.

If an address lookup fails in the TLB, then a conventional virtual hash page table VHPT walker, if enabled, searches for the translation in a virtual hash page table 134 (VHPT). If a matching entry is found, then the translation is inserted into the TLB and the physical address is obtained. A page table address (PTA) register (not shown, for simplicity, but well known) controls the behavior of the VHPT walker: The PTA includes parameters that contain information (PTA.base) for creating the VHPT base address, for determining whether the VHPT walker is enabled (PTA.ve), and for determining whether the VHPT is in short format or long format (PTA.vf). There is also a bit in each entry of the region registers 132 that indicates whether the VHPT walker is enabled for the particular region. More detailed information about the PTA's structure and function is available from publicly available manuals from Intel Corp. If a matching entry is not found in either the TLB or the VHPT, a TLB Miss fault issues. An OS typically responds to a TLB Miss fault, often by placing the required translation in the TLB. The handling of a TLB Miss fault is described in greater detail below, however.

Figure 5:
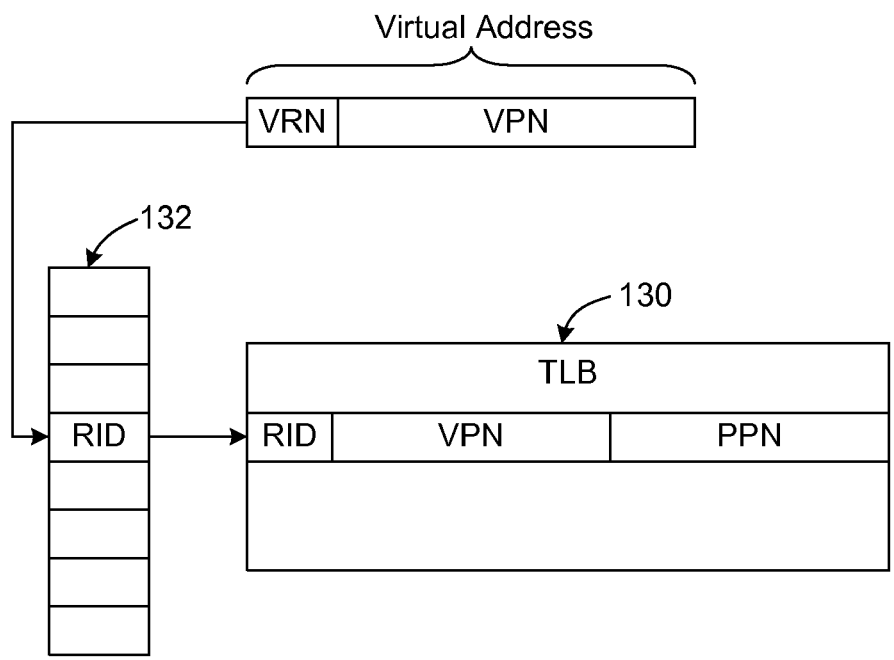
FIG. 5 is a simplified representation of the features of FIG. 4 related to the invention.

FIG. 5 is a simplified version of FIG. 4 that shows the features of virtual address space translation used in the IA-64 that are most relevant to the invention: The VRN of the virtual address is used to select one of the region registers 132, in particular, the register RRn where n=VRN. The region ID (RID) in the selected region register (RR(VRN)) along with the VPN is then used to search the TLB 130 to find the corresponding PPN. (The offset in the physical address will be the same as in the virtual address.) The RID in RR(VRN) must match that in the hardware TLB. In a preferred embodiment of the invention, a special RID is assigned to the monitor address space (VMMRID). If RR(VRN) does not contain the monitor RID, then no monitor entries in the hardware TLB will match the virtual address.

Regions and Execution Modes

As mentioned above, the address space of an IA-64 system allows for separate addressing of $2^{64}$ different bytes at any time, since each address contains 64 bits. To manage this address space, the upper (most significant) three bits of each address are used to form the VRN, which designates a $2^{61}$-byte "region." The VM and the VMM are loaded initially in different regions using any known method by the host OS. More specifically, the monitor RID is loaded into one of the region registers, while the other seven region registers may be loaded with RIDs for use by the VM.

Since the monitor occupies one region, the VM can freely access the other seven regions, which comprise $7*2^{61}$ bytes of memory space. Although this memory space is more than big enough to contain any code and data the VM might need, the VM may still attempt to access the address space that is assigned to the VMM. This must be prevented. One way to prevent such "unauthorized" and potentially dangerous access is by using a region relocation procedure described in co-pending U.S. patent application Ser. No. 10/263,245, "Virtualization System for Computers with a Region-Based Memory Architecture", which is hereby incorporated by reference herein. In very simple terms, the VMM does not allow the VM to use the dedicated monitor RID. The VMM loads the monitor RID into a first one of the region registers. If the VM attempts to use the first region register, which contains the monitor RID, the VMM moves the monitor RID into a different one of the region registers and loads an appropriate VM RID into the first region register. The VMM then allows the attempted VM memory access, using the first region register, to complete. In this manner, the VMM is relocated in the virtual address space as needed so as to allow for as much direct execution of VM instructions as possible.

The VM/VMM pair executes in different modes, each of which involves access to either the VM's memory region, the VMM's current memory region, or both. The three main execution modes are referred to here as the direct execution mode, the binary translation mode, and the monitor mode. If an external interrupt or a fault occurs when the VMM is executing, it preferably saves the interrupted context and enters the monitor mode, in which it will decide to return to the host OS kernel or resume in translation mode or direct execution. The interrupt handler is responsible for swapping the register state and the page table address, so it may be considered to be an additional execution mode.

Figure 6:
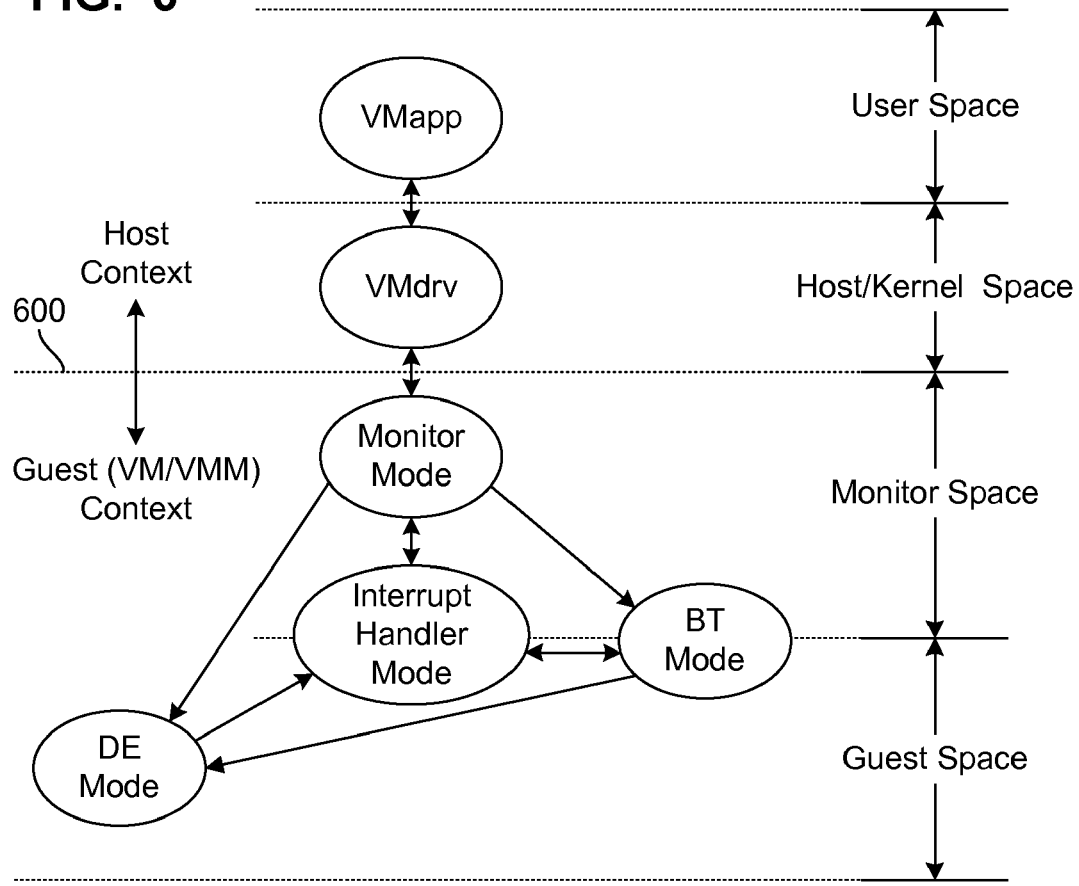
FIG. 6 illustrates state transitions and control flow for a VMM, as well as communication paths between the VMM, on the one hand, and a driver and a user-level application used to communicate with a host OS on the other hand as found in a preferred embodiment of the invention.

FIG. 6 illustrates the state transitions of the VMM as well as communication paths with VMdrv and VMapp. The figure also shows the parts of the total memory space in which the different states operate. The contextual line 600 (see FIG. 1) between the host and guest contexts or "worlds" is also shown. As the figure shows, the application VMapp operates in the user-level address space, the driver VMdrv is located in the host/kernel space, execution in the monitor mode takes place within the monitor (VMM) space, direct execution takes place in the guest (VM) space, and binary translation and interrupt handling generally require access to both the VMM and the VM spaces. Translations for the user-level address space and the host/kernel space are typically contained in a single page table, as determined by the host OS. In the preferred embodiment, translations for the monitor space are contained in a second page table, while translations for the guest space are contained in a third page table. These page tables are described in greater detail below.

VMM Memory Space

The VMM runs in either its own VMM memory space, or in the VM's guest space, and often in both. In the monitor space, the monitor's code and data are directly addressable. The monitor space also contains an area shared with VMapp, as well as the guest physical memory, which, in IA-64 systems, the VMM can access directly.

Figure 7:
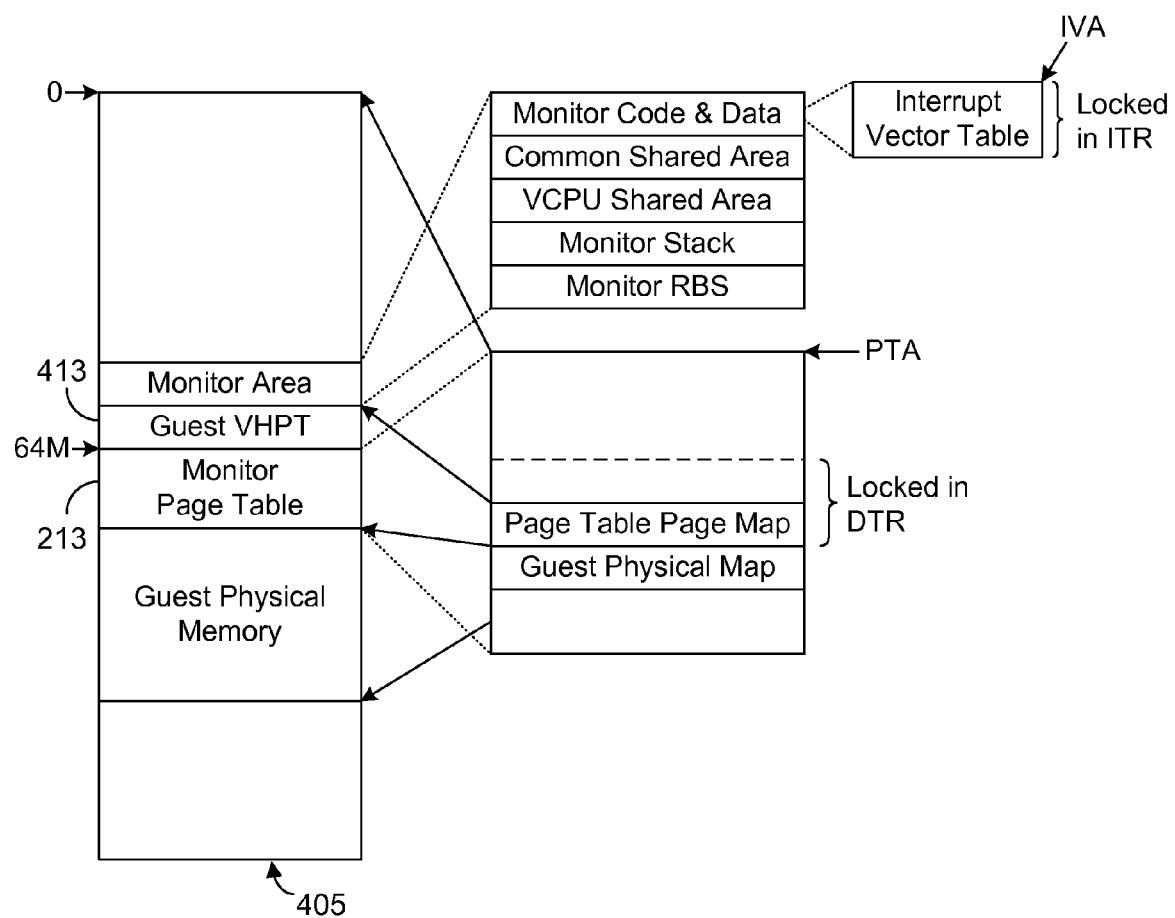
FIG. 7 illustrates one example of the address space of a VMM used in the preferred embodiment of the invention.

FIG. 7 illustrates the VMM address space 405, which is located in a single virtual address region and is addressed by a short-format Virtual Hash Page Table (VHPT, also referred to here as the VMM or monitor page table) 213. The monitor's virtual address space is divided into the monitor area, a guest VHPT (GVHPT, also referred to here as the guest page table) 413, the monitor page table 213 and guest physical memory areas. FIG. 7 also shows more detailed breakdowns of the monitor area and monitor page table 213.

The monitor area is accessed mainly when the VMM runs in monitor mode, that is, when the code defining the VMM is being executed. It is therefore further divided into code and data, a common shared area, a VCPU shared area, a stack, and a register backing store (RBS). The interrupt vector table (IVT) is a section of the monitor code, which is pointed to by the hardware interruption vector address (IVA) and is always locked in an instruction translation register (ITR) of the TLB when the VMM is running.

The GVHPT is a long-format VHPT table that serves as a second level TLB table for guest virtual address translations. When running in the direct execution mode or the binary translation mode, the hardware Page Table Address (PTA) points to the start of the GVHPT. The entries in the GVHPT are shadowed in the guest TLB and in VHPT tables created by the guest OS. The GVHPT contains translations from GVPNs to PPNs, while the guest TLB and the guest OS page tables contain translations from GVPNs to GPPNs.

The monitor page table maps all areas accessible to the VMM in a short-format VHPT table. When running in the monitor, the hardware PTA points to the start of the monitor page table. The page that contains translations for the monitor page table and the GVHPT is locked in the data translation register (DTR) of the hardware TLB.

The physical (machine) memory used by the guest is also represented as a continuous virtual address region that maps to the conceptual guest physical memory. Guest physical memory can be directly accessed by adding a constant offset to the guest physical address.

The virtual system hardware 301 is assumed to have the same IA-64 (or other non-segmented) architecture as the host; otherwise, direct execution will in general not be possible at all. Also, recall that the VM is intended to act as a complete hardware and software computer system. This means that the structure shown in FIG. 4 is replicated in the VM. The VM will consequently preferably have a guest TLB, protection key registers, region registers, hash table, walkers, etc., just like a "real" computer.

Physical Addressing Virtualization

As is mentioned above, the VMM (monitor) maps the guest (VM) physical memory to the host physical ("machine") memory. The VM (guest) memory is not guaranteed to map to consecutive machine memory; rather it is mapped in page-sized units defined by the host OS. When the VM accesses its guest physical address (GPA), the VMM splits the GPA into a GPPN and an offset. The hardware, physical address PA is then obtained by mapping GPPN→PPN and concatenating the invariant page offset.

Explicit translation is unnecessary when the VMapp and the VMM access the VM memory space. In the VMapp, guest physical memory is allocated using standard host OS commands, so accesses to the guest physical memory can be achieved through standard host OS virtual addressing.

From the perspective of the host OS, both the VM and the VMM occupy a common virtual address space. The VM, however, acting as a "complete" computer, may have a different notion of the available virtual address space. Similarly, the VMM also has a notion of the available virtual address space that is typically broader than that of the VM's, since the VMM is aware of the VM but not vice versa. Note that the VMM's concept of virtual address space may be the same as the host OS's, but need not be.

Once a guest starts using a page of physical memory, so that there are one or more translations to the physical page in the hardware TLB 130 or the GVHPT 413, the host OS must not be allowed to reuse the physical page. This is achieved by locking the machine page PPN from the host OS. Initially, no VM physical memory is locked; machine pages are locked and unlocked on demand.

Virtual Addressing Virtualization

Figure 8:
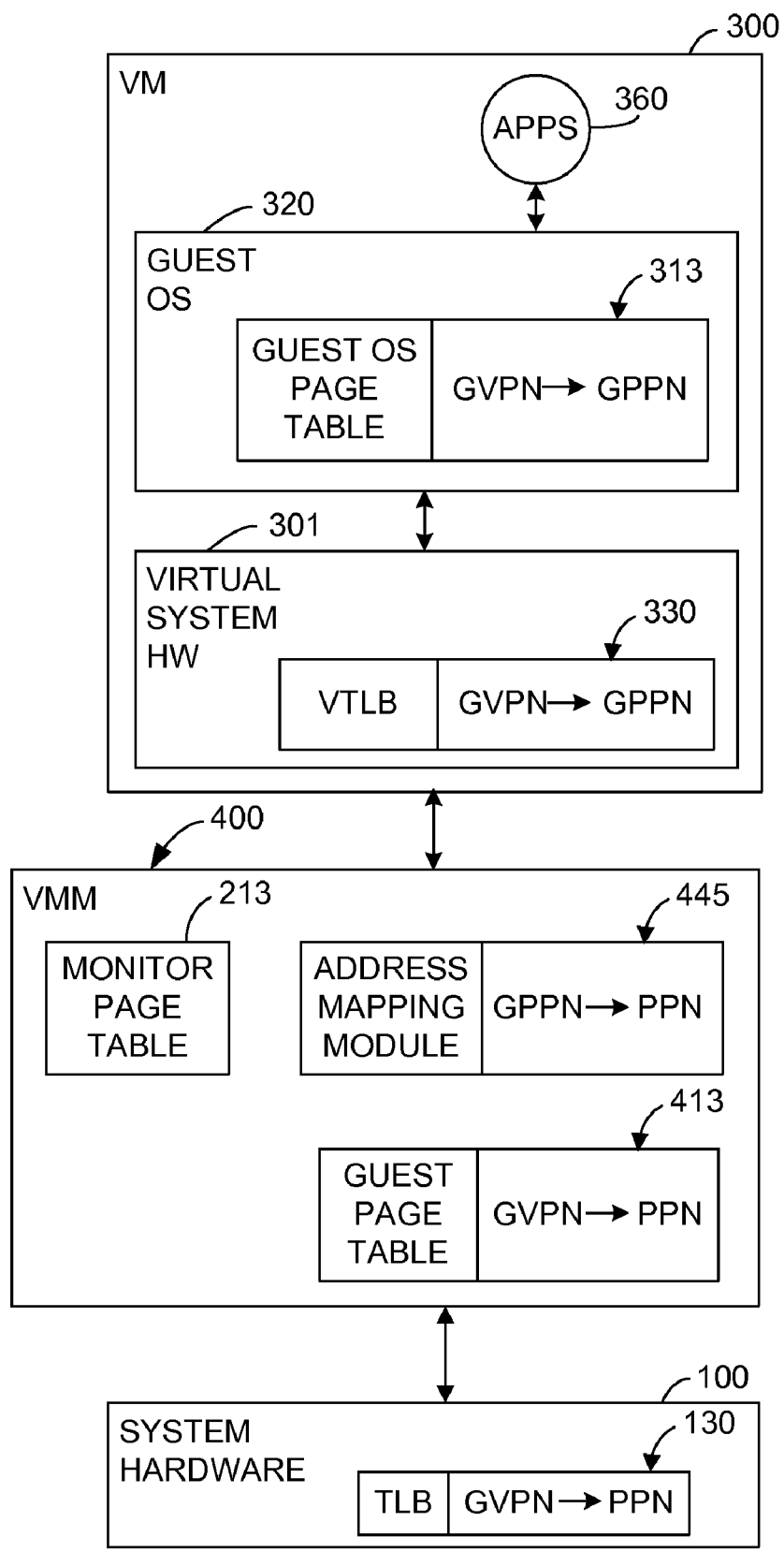
FIG. 8 illustrates portions of the virtual computer system of FIG. 1 that are used to map guest virtual addresses to hardware physical addresses.

FIG. 8 illustrates portions of the virtual computer system of FIG. 1 that are used to map guest virtual addresses to hardware physical addresses. FIG. 8 merely emphasizes the portions of FIG. 1 that are most important to guest virtual address mapping. FIG. 8 is not intended to suggest an alternative virtual computer system.

FIG. 8 illustrates the virtual machine 300, including the virtual system hardware 301, the guest OS 320 and the guest applications 360. The guest OS 320 may be a conventional operating system, such as a Microsoft Windows operating system or a Linux operating system. Just as if operating on real hardware, the guest OS 320 will typically create and maintain one or more guest OS page tables 313, including translations from guest virtual page numbers (GVPNs) to guest "physical" page numbers (GPPNs). Also, just as if operating on real hardware, the guest OS 320 will typically, from time to time, insert translations from the guest OS page tables 313 into the guest TLB 330 (or virtual TLB or VTLB), such as in response to a TLB Miss fault that reaches the guest OS 320.

FIG. 8 also illustrates the system hardware 100, including the hardware TLB 130. Suppose that the VMM 400 is executing in direct execution mode, so that guest instructions are being executed directly on the underlying hardware. Assuming that virtual addressing is enabled in the VM 300, the guest instructions will contain guest virtual addresses. The system hardware 100 must translate these guest virtual addresses directly into hardware physical addresses. As a result, the hardware TLB 130 must contain translations from the guest virtual page numbers (GVPNs) to the hardware physical page numbers (PPNs). The VMM 400 creates and maintains the guest page table 413 for holding translations from GVPNs to PPNs. The CPU 102 and the VMM 400 will each typically insert translations from the guest page table 413 into the TLB 130.

As described above, the VMM 400 must correlate GPPNs with PPNs to create GVPN→PPN translations for the guest page table 413 and the TLB 130, based on GVPN→GPPN translations in the guest TLB 330. The address mapping module 445 determines these correlations, using the monitor page table 213. FIG. 8 illustrates the VMM 400, including the guest page table 413, the address mapping module 445 and the monitor page table 213.

Suppose again that the VMM 400 is executing in direct execution mode. Suppose further that the system hardware 100 attempts a guest memory access for which a translation is not found, and so the system hardware 100 issues a TLB Miss fault. The TLB Miss fault indicates that the TLB 130 does not contain a translation for the GVPN that gave rise to the fault. A few different situations could cause such a fault to occur. First, the required translation may be contained in the guest page table 413, even though it was not found by the system hardware 100. In the preferred embodiment, a page table walker in the system hardware 100 would be enabled and the walker would be pointed to the guest page table 413. Nonetheless, in the IA-64 architecture, there is no guarantee that the walker will complete a walk of the page table and find a matching translation. Thus, a TLB Miss fault does not necessarily mean that the required translation is not contained within the guest page table 413. Another possibility is that a translation for the GVPN is contained in the VTLB 330, indicating a corresponding GPPN, but the guest page table 413 does not contain a translation for the GVPN. Yet another possibility is that neither the guest page table 413 nor the VTLB 330 contains a translation matching the GVPN.

Figure 9:
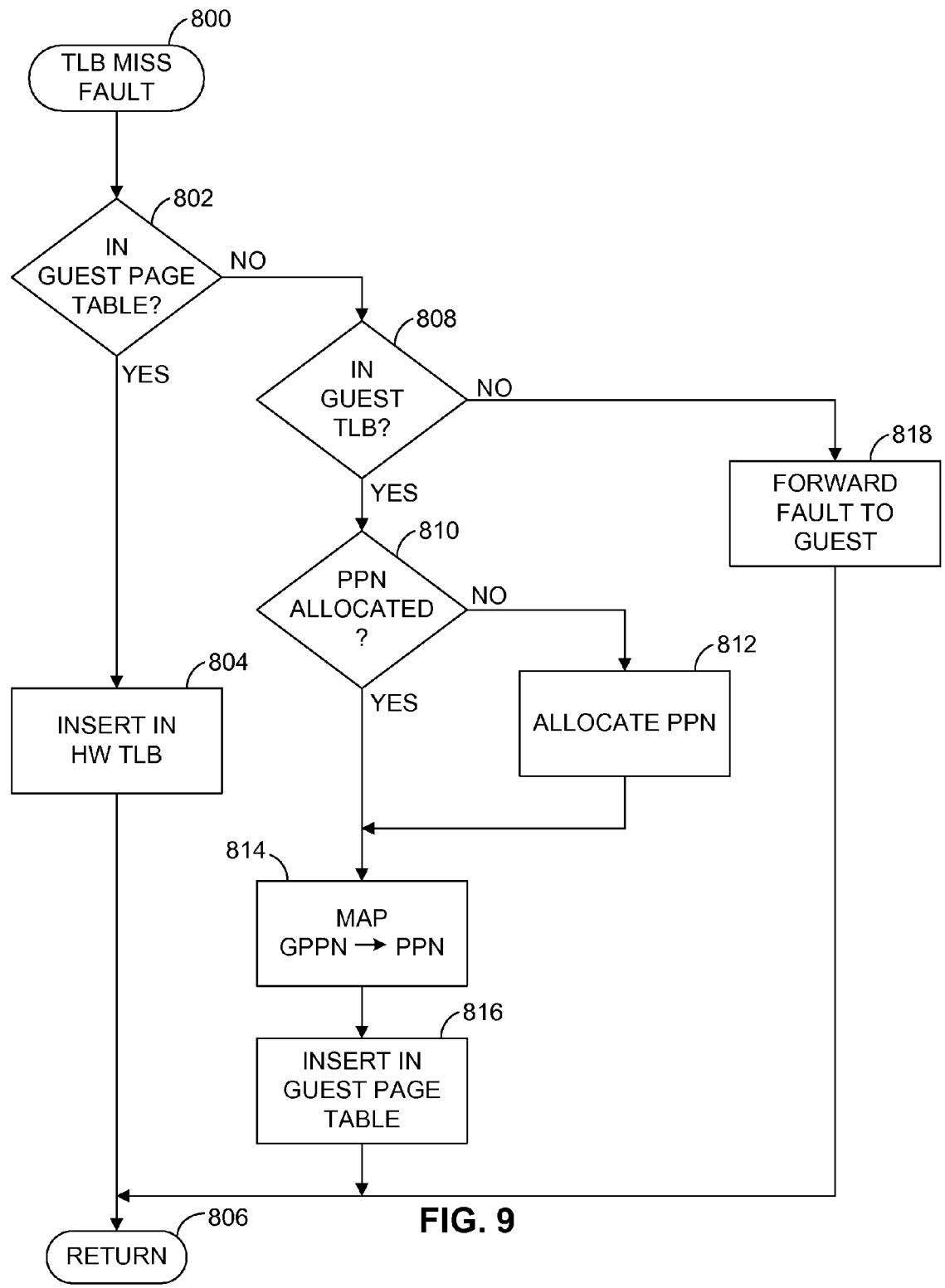
FIG. 9 is a flow chart illustrating a general response in a virtual computer system to a TLB Miss fault resulting from an attempt to access guest memory.

FIG. 9 illustrates a general method that may be performed by the VMM 400, in response to a TLB Miss fault under these circumstances. The method begins at an initial step 800. At a step 802, the VMM determines whether the guest page table 413 contains a translation for the GVPN that gave rise to the TLB Miss fault. If there is a matching translation, the translation is inserted into the hardware TLB 130 at a step 804, and the method ends at a step 806.

If there is no matching translation in the guest page table 413, the method proceeds to a step 808 and determines whether there is a translation in the guest TLB 330. If there is no matching translation in the guest TLB 330, the method proceeds to a step 818. At this step, the VMM 400 forwards the TLB Miss fault to the guest OS 320. Again, just as if operating on real hardware, the guest OS 320 responds to the TLB Miss fault by finding an appropriate translation in the guest OS page table 313 and attempting to insert the translation into the guest TLB 330. In most architectures, including the IA-64 architecture, TLB insertions can only be performed when executing at a privileged level. However, during direct execution, the hardware executes at the least-privileged level. Thus, the attempt to insert a new TLB entry results in a privilege fault. The VMM takes control again, in response to the privilege fault, and inserts the translation provided by the guest OS into the guest TLB. Again, the method ends at the step 806.

If there is a matching translation in the guest TLB 330, the method of FIG. 9 proceeds to a step 810. The address mapping module 445 now converts the GVPN→GPPN translation of the guest TLB into a GVPN→PPN translation for insertion into the guest page table 413. First, at the step 810, the address mapping module determines whether a physical memory page has been allocated for the addressed GVPN. As described above and as illustrated in FIG. 7, the guest physical memory is mapped into the address space of the VMM. Thus, the address mapping module takes the GPPN from the translation from the guest TLB and determines a corresponding VMM VPN, typically by simply adding a value that represents the offset of the guest physical memory within the VMM address space. The address mapping module next checks the monitor page table 213 for a translation for the determined VMM VPN. The monitor page table contains translations from VMM VPNs to PPNs for all pages within the VMM address space that are loaded into physical memory. If the address mapping module does not find a valid translation to a PPN for the VMM VPN corresponding to the GPPN, then the GPPN has not yet been allocated a page of real physical memory. In this case, the method proceeds to a step 812, and the VMM initiates a context switch to the host context, and causes the VMapp 500 to request an allocation of memory from the host OS 220 for the memory page of the GPPN. After the VMapp receives the memory allocation, control returns to the VMM, and the VMM receives the PPN of the newly allocated memory page. The address mapping module 445 creates a new translation within the monitor page table 213 between the VMM VPN corresponding to the GPPN, and the PPN of the newly allocated memory page.

The method of FIG. 9 proceeds to a step 814, either after determining, at the step 810, that a page of physical memory had already been allocated, or after getting a memory allocation at the step 812. In either case, the address mapping module 445 has a PPN for a memory page that has been allocated for guest physical memory and that corresponds with the VMM VPN determined above. In the first case, the PPN is determined from the translation in the monitor page table 213, while, in the second case, the PPN is returned with the memory allocation. In either case, at the step 814, the address mapping module 445 associates the GVPN that gave rise to the TLB Miss fault with the determined PPN. Next, at a step 816, the address mapping module uses this association to create a new entry for the guest page table 413. The new entry for the guest page table 413 will be based on the corresponding entry in the guest TLB 330, but possibly with some of the fields of the entry modified to ensure the accurate and safe operation of the VM 300. For example, the access rights of the entry in the guest page table 413 may be more restrictive than the access rights specified by the guest OS 320 for the entry in the guest TLB 330. After the step 816, the method of FIG. 9 ends at the step 806.

The method of FIG. 9 may give rise to multiple TLB Miss faults, one after another. For example, if the guest page table 413 and the guest TLB 330 do not contain a matching translation for a guest memory reference, the method of FIG. 9 reaches the step 818, and the VMM forwards the TLB Miss fault to the guest OS 320. In response, the guest OS 320 will typically insert an appropriate translation into the guest TLB. However, the hardware TLB 130 and the guest page table 413 still do not contain a matching translation. Consequently, another TLB Miss fault will issue when another attempt is made to execute the same instruction. This time, the method of FIG. 9 reaches the step 816, and an appropriate translation is placed in the guest page table 413, based on the entry made to the guest TLB 330 during the prior pass through the method of FIG. 9. Again, however, there is still no matching translation in the hardware TLB 130. The next time the same instruction is executed the CPU 102 may find the translation that was added to the guest page table 413, the CPU 102 would then add the translation to the TLB 130 and the instruction would execute successfully. Alternatively, the CPU 102 may not find the translation in the guest page table 413. In this case, the method of FIG. 9 would be executed a third time, this time reaching the step 804, in which the VMM 400 inserts the translation from the guest page table 413 into the TLB 130.

The method of FIG. 9 has been described in connection with guest virtual memory accesses while the VMM 400 is operating in direct execution. The same method may also be applied to guest virtual memory accesses that occur while the VMM 400 is operating in binary translation mode.

The guest page table 413 (or the guest virtual hash page table or GVHPT) caches the VM's TLB entries for all VM virtual address translations. When the VM accesses a virtual address, the TLB entry is modified and loaded into the GVHPT, and the hardware or the VMM interrupt handler loads the GVHPT entry into the hardware TLB. When the VM changes its TLB entry, the VMM makes corresponding changes to the hardware TLB and GVHPT.

Region Register Virtualization

Figure 10:
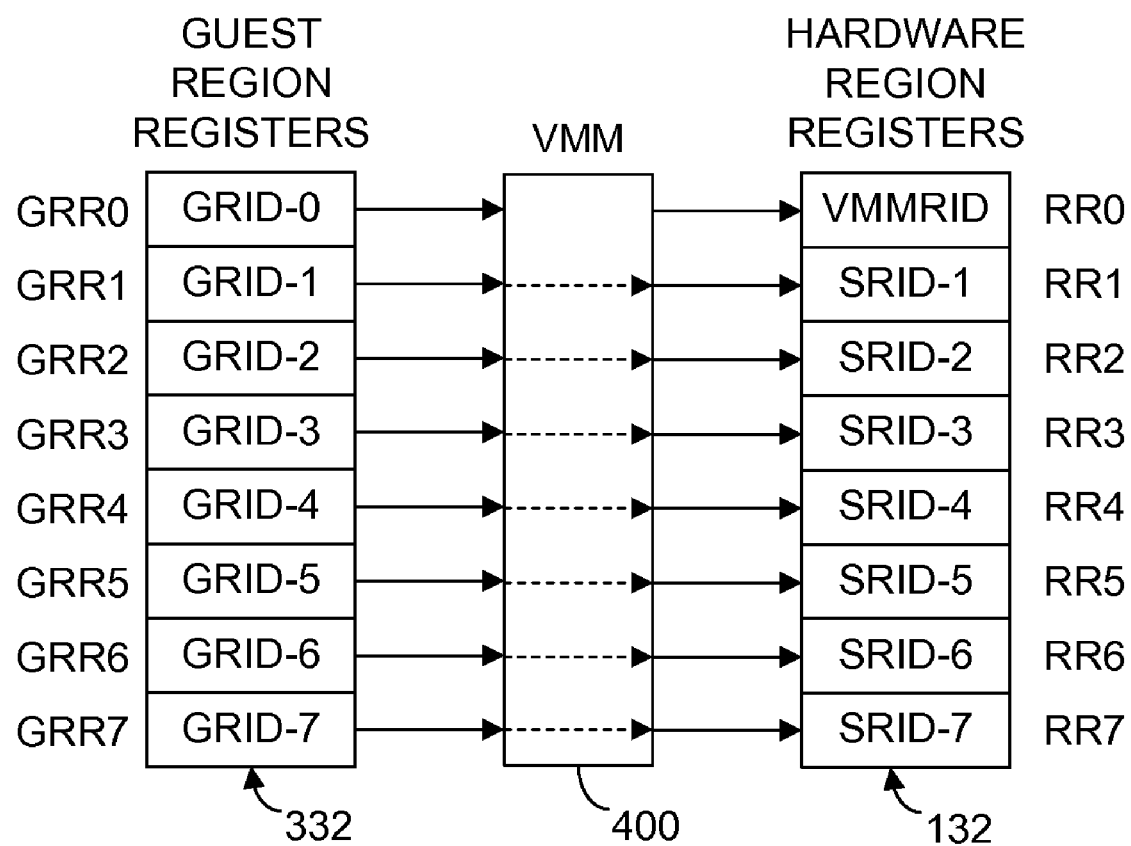
FIG. 10 illustrates the control of the hardware region registers by the VMM in a preferred embodiment of the invention.

FIG. 10 illustrates the virtualization of the region registers of the IA-64 architecture in the preferred embodiment. The contents of the VM's region registers (the guest region registers or GRRs) 332 are kept as a VMM data structure; the hardware region registers (RRs) 132 are then programmed using known methods to assist guest memory accesses. The guest region registers are used for guest virtual address translation. Except for the region used by the VMM, illustrated as RR0 in FIG. 10, each hardware region register preferably contains a shadowed RID (SRID) of the corresponding guest RID (GRID).

If the guest RID is in use, that is, if it exists in the hardware region register, the GVHPT, or the hardware TLB, then the guest RID is active. For each active guest RID, the VMM preferably assigns a unique shadowed RID, which must be different from the RID of the VMM region.

When a new shadowed RID is allocated, the VMM preferably also ensures, using known methods, that the hardware TLB and the GVHPT do not contain entries for the RID. Upon a context switch to the host, all hardware TLB entries containing shadowed RIDs must be purged.

Direct Execution, Binary Translation, and Memory Accesses

As FIG. 6 illustrates, execution in different modes involves different memory spaces. One mode—the direct execution mode—is described above and is well known in the art of virtualization: In the direct execution mode, VM instructions are executed directly on the host hardware processor, since they cannot affect any sub-system or access any memory, register, etc., that is off-limits to the VM. Direct execution is fast, because there is no need for intermediate processing in the VMM. The VMM therefore includes any known direct execution engine 460 to perform this function.

Binary translation is also mentioned above: A VM instruction (or instruction stream) cannot be allowed to execute as is for any of several reasons, for example, it attempts to access the VMM, or assumes a privilege level higher than the user level the VM runs at. Although possible, the VMM preferably detects the need for binary translation not by examining each VM instruction before it is to be executed, but rather by detecting exceptions, interrupts, etc., that arise from attempted execution of instructions that cannot be directly executed. The VMM itself establishes many of the mechanisms used to generate these exceptions, for example, using memory tracing; other interrupts will be raised by the underlying system software.

In the binary translation mode, a binary translation engine 462 in the VMM checks a translation cache 463 to determine whether there is an existing translation of the instruction (or instruction stream) into a form that is "safe" to pass to the hardware processor for execution. If there is such a translation, then the translation is executed. If there is not yet a translation, for example, the first time the instruction is encountered, the first time it traps, etc., then the binary translation engine generates one.

Alternatively, the VM instruction (or stream) under consideration can be passed to a conventional interpreter 464, which emulates the execution of the VM instruction(s) in software. Note that interpretation is usually cheaper than binary translation in terms of processing cycles required, but that binary translation will be much faster if a translation already exists in the cache 463—the translation can be used more than once.

Note that both direct execution and binary translation involve accessing the guest (VM) memory region. Binary translation, however, also involves access to the VMM memory region, in which the cache 463 is located; indeed, execution of the binary translation engine 462 typically takes place entirely within the VMM region, although it may access the VM's region as needed. Interpretation will typically take place wholly within the VMM region.

The VMM is also defined by data and instructions that must be executed—the VMM is a set of computer instructions and related data just like the VM or, indeed, the host system software 200. Assume for example that the VMM is implemented as a program in the C language. When the VMM is executing, that is, when the system is in the "monitor mode," the VMM "program" will follow the well known C run-time conventions. Similar conventions will of course be followed if the VMM is written in some other language.

VMM virtual Addressing and Region Migration

As mentioned above, the IA-64 virtual address space is divided into eight regions, which are indexed by the highest three bits of the virtual address. At any given time, the VMM occupies one region, whereas the other regions refer to the regions of the virtual address space in which the VM operates. In a preferred embodiment, the VMM region is dynamically migrated from one region to another depending on how the guest uses the regions. As a result, in direct execution and binary translation modes, the VM always accesses memory using the original guest virtual address, but with no risk of affecting the memory region the VMM is currently assigned to. When running in direction execution, if the guest accesses the region occupied by the VMM, then an access rights fault causes the VMM to switch to another region.

In the monitor mode, the VMM accesses both the VMM memory and the VM's physical memory via the conventional hardware TLB and VHPT walker on the monitor page table. Some monitor features, such as the monitor area and monitor page table, are therefore always mapped to host memory, whereas the guest physical memory is preferably mapped on demand.

VMM and VM Address Spaces

Figure 11:
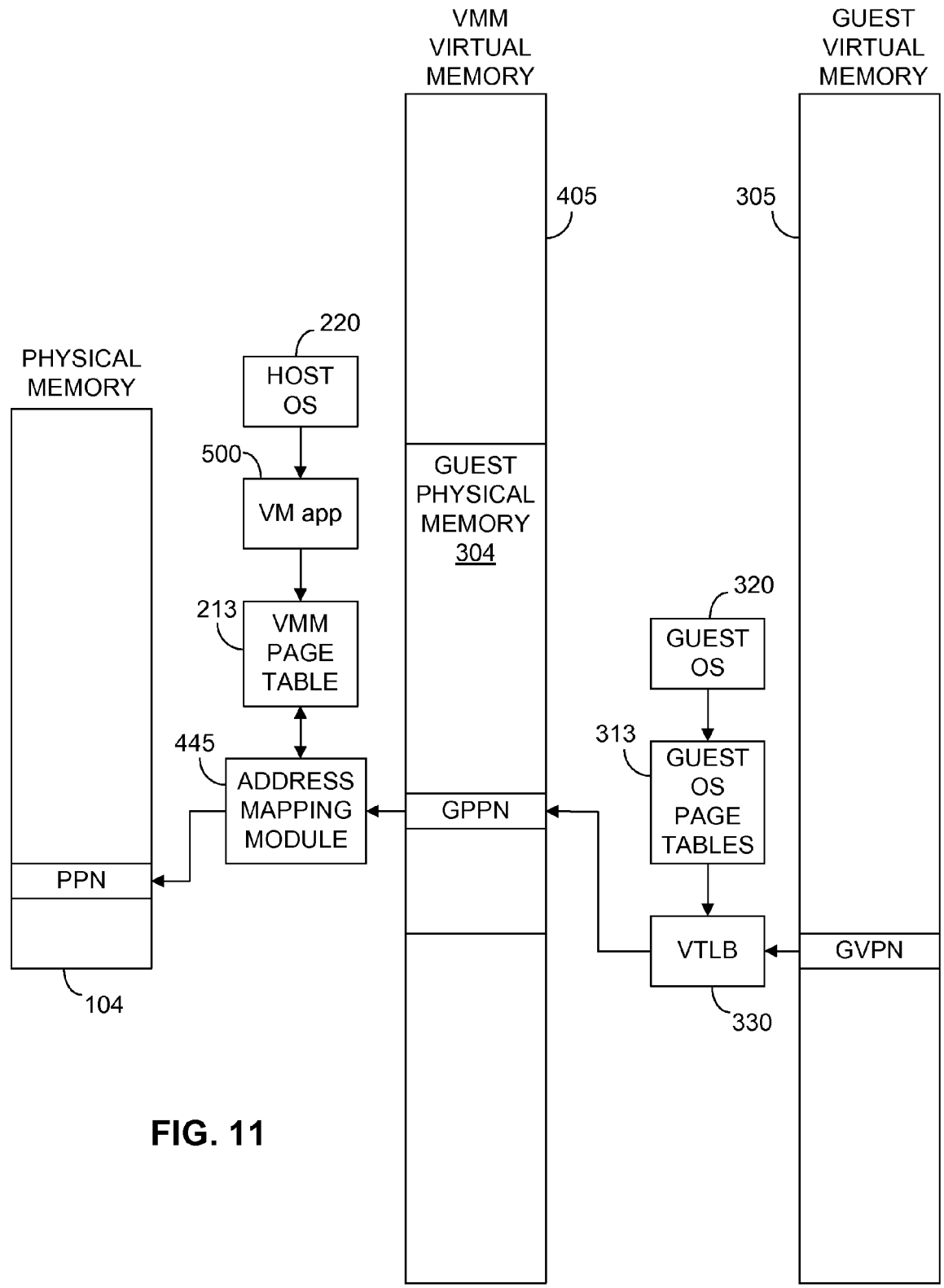
FIG. 11 illustrates the creation and operation of a VMM page table to map the virtual address space of the VMM to a physical address space, as well as an example of mapping a guest virtual address through to a hardware physical address in a preferred embodiment of the invention.

FIG. 11 illustrates the creation and operation of the monitor page table 213. The VM app 500 is loaded on top of the host OS 220 in a conventional manner. The VM app 500 then requests a memory allocation from the host OS 220. Using the allocated memory, the VM app 500 loads an image of the VMM 400 into memory, at the same system level as the host OS 220. Loading the image of the VMM 400, and subsequently beginning execution of the VMM 400, gives rise to the VMM virtual address space 405. The VM app 500 determines correlations between the VPNs of the VMM virtual address space 405 and the PPNs of the physical memory 104. Using these correlations, the VM app 500 creates the VMM page table 213 for mapping VMM virtual addresses to physical addresses. When the VMM 400 begins executing, the VMM creates and/or begins supporting the VM 300. The VM 300 has its own guest virtual address space 305, according to the IA-64 architecture.

As needed, the VM app 500 also requests additional memory allocations for the guest physical memory 304. The guest physical memory 304 is mapped into the VMM virtual address space 405 as illustrated in FIG. 11. As a result, the VMM 400 may access the guest physical memory 304 using its own virtual addressing. The pages of physical memory 104 that are allocated for guest physical memory 304 are "pinned" or "wired down" in the host OS 220 so that mappings for those pages remain constant. This allows the VMM 400 to consistently map GPPNs to PPNs, without having the mappings change from time to time, based on actions from the host OS 220. At some point, the guest OS 320 is loaded into the VM. The guest OS 320 creates its own set of one or more page tables 313 in a conventional manner, to provide translations between GVPNs and GPPNs. The VMM 400 exports the virtual TLB 330 to the VM 300 according to the IA-64 architecture. Translations are copied from the guest OS page tables 313 into the VTLB 330, generally by the guest OS 320. The address mapping module 445, within the VMM 400, maps the GPPNs from the VTLB 330 to the corresponding PPNs.

FIG. 11 illustrates how GVPNs are translated into GPPNs, and then into PPNs, in theory. However, in practice, a direct translation from GVPNs to PPNs is required. When virtual addressing is enabled, and the CPU 102 encounters an address for which a translation is required, the CPU 102 simply looks in the TLB 130, and possibly a page table indicated by the PTA, for a direct translation from the virtual address to a physical address. The design of the CPU 102 does not allow for using two translations to get from the virtual address to the physical address. Instead, the VMM 400 must provide the direct translations required by the CPU 102. In the preferred embodiment, the VMM 400 provides these direct translations in the guest page table 413 referred to above. More specifically, the address mapping module 445 takes entries from the VTLB 330, mapping GVPNs to GPPNs, and creates corresponding entries in the guest page table 413, mapping GVPNs to PPNs.

When the VMM 400 is active, the virtual memory system must translate virtual addresses from two distinct address spaces into their corresponding physical addresses, namely from the VMM virtual address space 405 and from the guest virtual address space 305. In particular, when the VMM 400 is in the binary translation mode, the virtual memory system must handle translations from both address spaces at the same time, even within the same instruction, as the translated instructions contain references to both address spaces. In other words, during the binary translation mode, two types of virtual address translations must be available to the MMU 108 at the same time, namely VMM translations (i.e. translations from virtual pages in the VMM address space 405 to the corresponding physical memory pages) and guest translations (i.e. translations from virtual pages in the guest address space 305 to the corresponding physical memory pages). Now there is generally nothing to prevent loading both VMM translations and guest translations into the TLB 130 at the same time. Then, so long as the required translations are found in the TLB 130, the MMU 108 can handle references to both address spaces. However, not all such translations will fit in the TLB 130 at the same time. When the MMU 108 encounters virtual addresses for which the TLB 130 does not contain translations, something must be done to provide the required translations. As TLB Miss faults occur fairly often in typical computer systems, providing the translations for multiple address spaces in an efficient manner is preferable. Providing access to translations for multiple address spaces at the same time, particularly in an efficient manner, is the primary problem solved by this invention.

One possible solution to this problem is to use a single page table that includes both types of translations. In this case, if the translation is not found in the TLB 130, the single page table can be used to obtain the required translation, whether the attempted access was from the VMM address space 405 or the guest address space 305. However, such a solution can be rather complex, especially in a multiprocessing environment. In a system in which a single VMM supports a VM having multiple VCPUs, guest translations would be unique to each VCPU, while VMM translations would be global. This solution may also adversely affect performance, as the single page table would typically have a larger number of entries than a page table that does not include two types of translations. This invention provides a different solution utilizing multiple page tables, with different type(s) of translations being stored in each page table, and a method for determining which page table contains the translation for a required virtual address.

Figure 12:
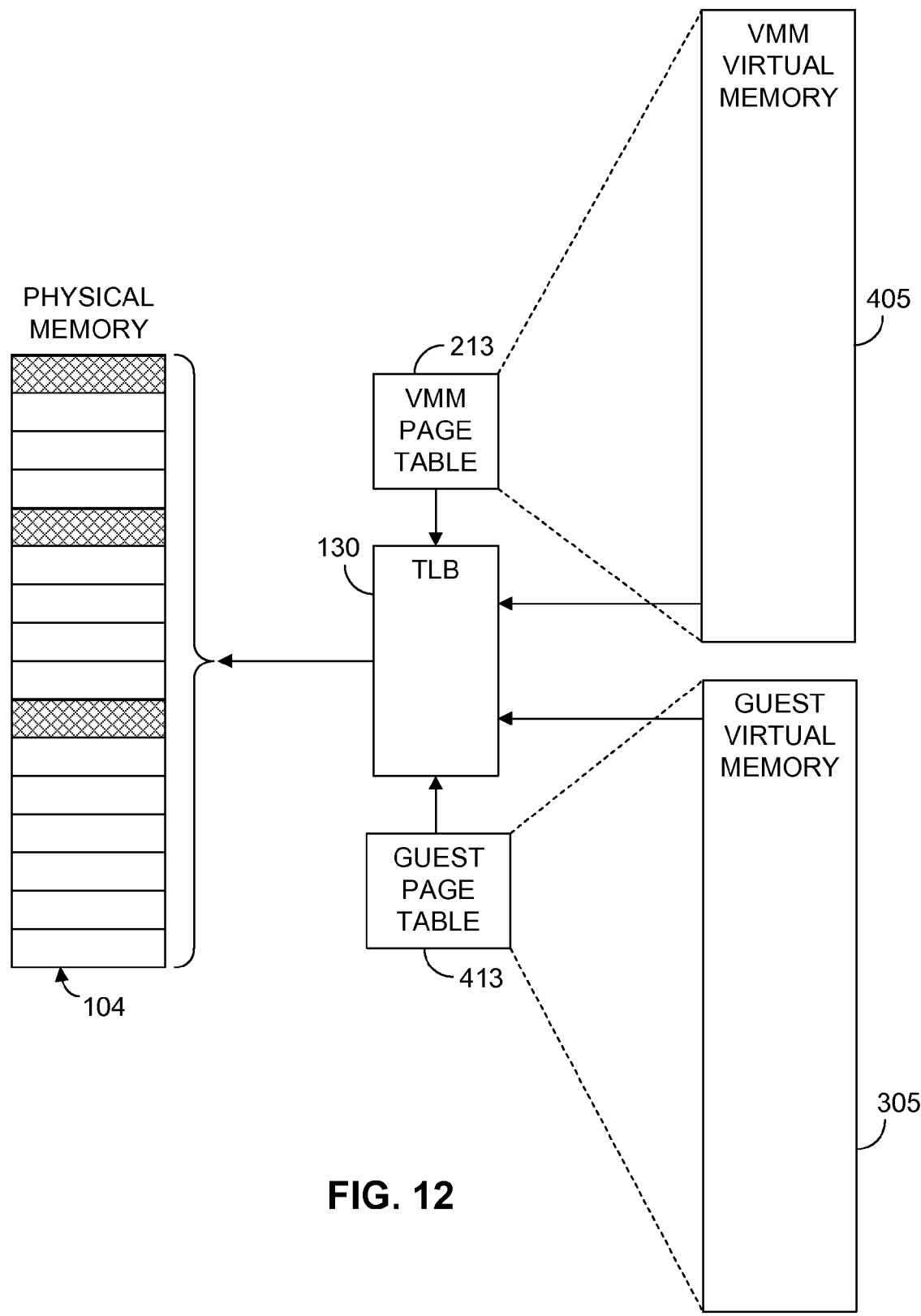
FIG. 12 illustrates the operation of the virtual memory system in a preferred embodiment of the invention in relation to the virtual address space of the VMM and the virtual address space of the VM.

In the preferred embodiment, there are two types of translations required and two corresponding page tables, namely the VMM page table 213 and the guest page table 413. FIG. 12 illustrates the operation of the VMM page table 213 and the guest page table 413 when the VMM 400 is active. The VMM page table 213 provides mappings between virtual addresses in the VMM virtual address space 405 and physical addresses in the physical memory 104. The guest page table 413 provides mappings between virtual addresses in the VM virtual address space 305 and physical addresses in the physical memory 104. As described above, the VMM page table 213 is created by the VM app 500. The VMM page table 213 is maintained, however, by the address mapping module 445. The guest page table 413 is created and maintained by the address mapping module 445. In the preferred embodiment, the guest OS 320 inserts new translations into the VTLB 330, and the address mapping module 445 inserts corresponding translations into the guest page table 413, as described above with reference to FIG. 9.

While the VMM 400 is active, the TLB 130 generally contains translations for the VMM address space 405 from the VMM page table 213, as well as translations for the guest address space 305 from the guest page table 413. The entries in the TLB 130 for the VMM address space 405 contain the VRN for the RR that contains the monitor's RID (VMMRID), while entries for the guest address space 305 contain other VRNs. The VMM 400 can access its own address space 405 using its own virtual addresses. However, the VMM address space 405 includes the guest physical memory 304. As a result, the VMM 400 is also able to access the guest physical memory 304 using its own virtual addresses. The VMM 400 can also access the guest address space 305 using guest virtual addresses. The guest software in the VM 300, however, can only access its own address space 305 using its own virtual addresses. If guest software attempts to access the VMM address space 405, an access rights fault results and the VMM address space 405 is relocated, as described above.

In the monitor mode, the PTA points to the VMM page table 213. The VMM 400 may access the VMM address space 405, including the guest physical memory 304, using its own virtual addresses. In monitor mode, the privilege level of the CPU 102 is set to the most-privileged level, so accesses to the VMM address space are permitted. In the preferred embodiment, the VMM 400 does not use guest virtual addresses to access guest virtual memory 305 while in monitor mode, although this use is possible. On an attempted memory access, the CPU 102 looks for the VMM virtual address in the TLB 130. If the virtual address is not found in the TLB 130, the VHPT walker checks the VMM page table 213 for the required translation. The IA-64 architecture does not guarantee, however, that the VHPT walker will find a translation, even if it is in the specified page table. If the VHPT walker does not find the translation, the required translation can be retrieved from the VMM page table 213 in response to a TLB Miss fault.

In the direct execution mode, the PTA points to the guest page table 413. The guest software may only access its own address space 305 using its own virtual addresses. In direct execution mode, the privilege level of the CPU 102 is set to the least-privileged level, so accesses to the VMM address space 405 are not permitted. On an attempted memory access, the CPU 102 looks for the guest virtual address in the TLB 130. If the virtual address is not found in the TLB 130, the VHPT walker checks the guest page table 413 for the required translation. If the VHPT walker does not find the translation, the required translation can be retrieved from the guest page table 213 in response to a TLB Miss fault.

In the binary translation mode, the PTA again points to the guest page table 413. In binary translation mode, the translated code may access the VMM address space 405 using VMM virtual addresses, and it may access the guest address space 305 using guest virtual addresses. In binary translation mode, the privilege level of the CPU 102 is set to the most-privileged level, so accesses to the VMM address space are permitted. On an attempted memory access, the CPU 102 again looks for the virtual address in the TLB 130, whether it is a VMM virtual address or a guest virtual address. If the virtual address is not found in the TLB 130, the VHPT walker checks the guest page table 413 for the required translation. Now, if the attempted memory access is to a VMM virtual address, the VHPT walker definitely will not find the translation in the guest page table. As described above, the VHPT walker also may not find a guest virtual address in the guest page table, however. Thus, if a TLB Miss fault occurs, the page table in which the translation may be found will depend on the address space used. If the guest address space is used, the required translation can be retrieved from the guest page table 213, while if the VMM address space is used, the required translation can be retrieved from the VMM page table 413.

Figures 13, 14:
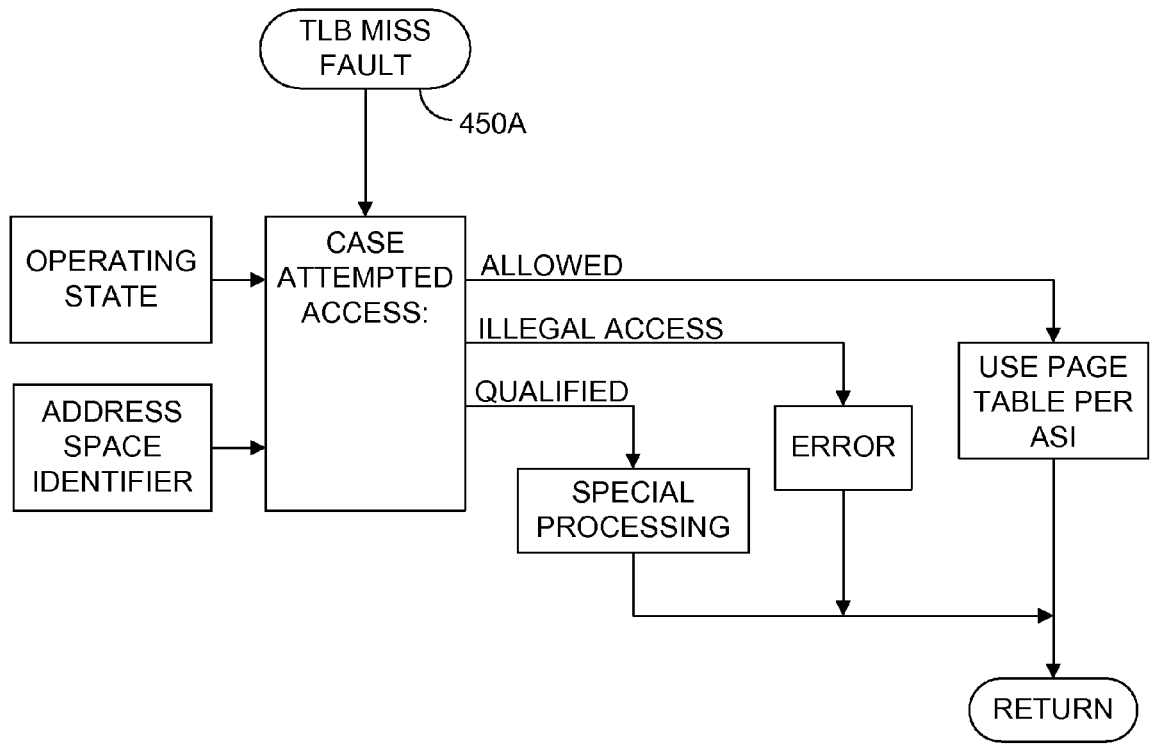
FIG. 13 illustrates the operation of a TLB Miss fault handler that is active when the system is in the VMM context, in a preferred embodiment of the invention.
FIG. 14 further illustrates the operation of the TLB Miss fault handler of FIG. 13.

The preferred embodiment of this invention provides a TLB Miss fault handler for use when the VMM 400 described above is active. The TLB Miss fault handler of this invention will be referred to as a "Miss handler" for the purpose of brevity. A general embodiment of a Miss handler 450A, according to this invention, is illustrated in FIG. 13. The Miss handler 450A is generally a standard TLB Miss fault handler, as is well known in the art, except as described herein. The Miss handler 450A responds to TLB Miss faults, when the VMM 400 is active, and determines whether, and under what circumstances, the attempted memory access that gave rise to the TLB Miss fault is permissible. The Miss handler 450A then takes appropriate action, as described below.

The Miss handler 450A receives information about an operating state of the computer system in which the Miss handler 450A is implemented. In the preferred embodiment, the operating state for which information is provided is the execution mode of the VMM 400. Specifically, the Miss handler 450A receives information indicating whether the VMM 400 is in monitor mode, direct execution mode or binary translation mode. In the preferred embodiment, the VMM 400 writes a value into a register before entering one of these modes; the value indicating which mode is being entered. In the IA 64 architecture, a bank 0 register is used, so that the register is accessible while an interruption handler is executing, but the register is not accessed during normal execution, such as in the direct execution, binary translation and monitor modes. Upon activation, the Miss handler 450A reads this value from the register to determine the execution mode of the VMM 400 during the attempted memory access that caused the TLB Miss fault. The Miss handler 450A also receives an address space identifier, indicating the address space of the attempted memory access. In the preferred embodiment, the address space identifier comprises the VRN from the virtual address of the attempted memory access. In the IA-64 architecture, the Miss handler 450A gets the VRN of the virtual address that caused the TLB Miss fault from the interruption faulting address register.

Based on the operating state and the address space identifier, the Miss handler 450A determines whether, and under what circumstances, the attempted memory access is permitted. The attempted memory access may be allowable as is, it may not be allowed at all, or it may be allowed with one or more qualifications. If the attempted memory access is not allowed at all, an appropriate error is raised to either the VMM 400 or the guest OS 320. If the attempted memory access is allowed with one or more qualifications, then the Miss handler 450A calls one or more routines to perform whatever processing is necessary to evaluate and/or implement the qualifications. If the attempted access is allowable as is, the Miss handler 450A uses the address space identifier to identify a page table in which the required translation may be found, obtains the translation from the page table and inserts the translation into the TLB 130.

FIG. 14 is a table specifying details of the operation of the Miss handler 450A in the preferred embodiment. The possible execution modes, or operating states, are shown in the first row of the table as Monitor mode, Binary Translation mode and Direct Execution mode. The address space identifier is shown to be the VRN, which has a value of either "VMMVRN" or "!VMMVRN" (i.e. "not VMMVRN"). A value of VMMVRN indicates the VRN that points to the RR that contains the VMM's RID. Thus, a value of VMMVRN indicates an attempted access to the VMM virtual address space 405. !VMMVRN indicates any other VRN, which corresponds with an attempted access to the guest virtual address space 305. So, with the configuration illustrated in FIG. 10, VMMVRN is 0, while !VMMVRN is any other value from 1 to 7.

As shown in FIG. 14, if the VMM 400 is in the monitor mode and attempts a memory access to the guest address space 305, with a VRN of !VMMVRN, the attempted memory access is "illegal," and the Miss handler 450A reports an error condition to the VMM 400. If the VMM 400 is in the direct execution mode, and an attempted memory access has a VRN of VMMVRN, then the guest software is attempting to access a memory location in the VMM's region, or the VMM address space 405. As described above, the preferred embodiment responds to such an attempted access by relocating the VMM address space to a different region. In this case, the Miss handler 450A calls an appropriate routine to handle the region relocation. Any other possible combination of execution mode and VRN represents an attempted memory access that is allowable as is. In each of these cases, the table of FIG. 14 indicates the page table that is used by the Miss handler 450A to find the required translation. Thus, if the VRN is VMMVRN and the execution mode is either monitor mode or binary translation mode, then the Miss handler 450A gets the required translation from the monitor page table 213. If the VRN is !VMMVRN and the execution mode is either binary translation mode or direct execution mode, then the Miss handler 450A gets the required translation from the guest page table 413. If the required translation is not found in the guest page table 413, then the VMM 400 performs the method of FIG. 9 to obtain the required translation, as described above.

A fourth execution mode was also mentioned above, namely the interrupt handler mode. In the preferred embodiment, however, the Miss handler 450A does not need to handle TLB Miss faults occurring while the VMM 400 is in the interrupt handler mode. As is common practice, translations for the virtual memory pages that are used by the interrupt handlers are locked in the translation registers of the TLB 130. As a result, TLB Miss faults generally don't occur when the VMM 400 is in interrupt handler mode. It is still possible, however, for a TLB Miss fault to occur while the Miss handler 450A is executing. For example, a TLB Miss fault may occur when attempting to find a translation in a page table. As is common practice, though, such nested TLB Miss faults are handled by a separate software routine, instead of by the ordinary TLB Miss fault handler.

As described above, the VMM 400 includes an interpreter 464. During interpretation, the VMM is considered to be in the monitor mode. As with the rest of the monitor mode, the interpreter accesses the guest address space 305 using VMM virtual addresses to address the guest physical memory 304 within the VMM address space 405, instead of using guest virtual addresses. Also, when the interpreter is active, TLB Miss faults are handled as described above for the rest of the monitor mode.

In another embodiment, however, interpretation is not considered to be a part of the monitor mode, and the interpreter 464 uses guest virtual addresses to access the guest virtual address space 305 and VMM virtual addresses to access the VMM address space 405. In this embodiment, the interpreter may be used instead of, or in addition to, the binary translation engine 462. In this embodiment, TLB Miss faults that occur when the VMM 400 is in an interpretation mode, are handled in the same manner as described above relative to the binary translation mode, with accesses being allowed to either the VMM address space or the guest address space, with the PTA pointing to the guest page table 413, and with the VRN of an attempted access indicating whether a translation can be found in the VMM page table 213 or the guest page table 413. The binary translation engine and the interpreter will be referred to more generally as emulators, and the binary translation mode and the interpretation mode will be referred to more generally as emulation modes. Other emulators and emulation modes are also possible, such as, for example, an emulator that uses a combination of binary translation and interpretation.

In another embodiment, the VMM 400 uses both the VMM address space 405 and the guest address space 305 when in the monitor mode. In this embodiment also, TLB Miss faults that occur when the VMM 400 is in the monitor mode, are handled in the same manner as described above relative to the binary translation mode, with accesses being allowed to either the VMM address space or the guest address space, with the PTA pointing to the VMM page table 213, and with the VRN of an attempted access indicating whether a translation can be found in the VMM page table 213 or the guest page table 413. In still other embodiments, the PTA points to the VMM page table 213 during the binary translation mode, the interpretation mode, or both, with other aspects of the embodiments being the same as described above. Similarly, in yet another embodiment, where the VMM 400 uses both the VMM address space 405 and the guest address space 305 when in the monitor mode, the PTA points to the guest page table 413 during the monitor mode, with other aspects of the embodiment being the same as described above.

In the preferred embodiment, the operating state and the address space identifier are readily available to the Miss handler 450A. The Miss handler 450A can quickly determine whether, and under what circumstances, the attempted memory access is allowed. In the event that the attempted access is allowable as is, the Miss handler 450A can also quickly determine which page table to use to find the required translation. In the preferred embodiment, the Miss handler 450A can make all of these determinations, get the required translation from the identified page table and insert the translation in the TLB 130 quickly, and with relatively few instructions. As a result, in the preferred embodiment, a call to higher-level code and a corresponding context switch are not required, except in the case of an illegal attempted memory access, an attempted access that requires a relocation of the VMM region or an attempted access for which the required translation is not found in the appropriate page table. Context switches are notoriously expensive, in terms of consuming processing resources. Thus, the invention's avoidance of context switches, except in situations that will generally arise relatively infrequently, provides an efficient Miss handler 450A.

In the preferred embodiment, the CPU 102 is set up to automatically load address mappings into the TLB 130. The hardware VHPT walker is enabled, and the PTA register is loaded to point to the guest page table 413 while in the binary translation mode or the direct execution mode, and to the VMM page table 213 while in the monitor mode. If a required address mapping is not contained in the TLB 130, the VHPT walker attempts to find the required mapping in the indicated page table. If the mapping is found, it will be automatically loaded into the TLB 130. Such hardware loading of the TLB 130 is substantially faster than using software to insert an entry into the TLB 130. Also, the guest page table 413 is a long-format VHPT table, while the VMM page table 213 is a short-format VHPT table. Using the long-format for the guest page table provides more flexibility in adding guest address mappings, while the short-format provides a simpler, more efficient page table for the VMM, where the flexibility is not needed.

The preferred embodiment of the invention has been described relative to a particular virtual computer system. However, the invention can also be implemented in a wide variety of other computer systems, including a wide variety of other virtual computer systems and a wide variety of other computer systems that do not implement virtual computer systems. The invention can also be implemented in systems involving different types of operating states and different address space identifiers, as well as systems involving the concurrent use of more than just two page tables.

What is claimed is:

1. In a virtual computer system comprising a virtual machine monitor having a first address space and a virtual machine having a second address space, a method for responding to a TLB Miss fault resulting from an attempted memory access, the virtual computer system further comprising a first page table for mapping addresses from the first address space and a second page table for mapping addresses from the second address space, the virtual computer system further comprising a first routine executing in the same context in which the TLB Miss fault occurred and a second routine executing in a different context from the first routine, the method comprising:

the first routine determining an operating state in which the virtual computer system was operating when the TLB Miss fault occurred;

the first routine receiving an address space identifier which indicates if the attempted memory access was to the first address space or the second address space;

the first routine using the operating state and the address space identifier to determine if the attempted memory access is permitted; and if the attempted memory access is permitted, the first routine using the address space identifier to determine if the attempted memory access was to the first address space or the second address space, and, if the attempted memory access was to the first address space, the first routine attempting to find a translation for the attempted memory access in the first page table, or, if the attempted memory access was to the second address space, the first routine attempting to find a translation for the attempted memory access in the second page table, or if the attempted memory access is not permitted, causing a context switch to be performed to switch execution to the second routine for responding to the impermissible attempted memory access.

2. The method of claim 1, wherein the operating state in which the virtual computer system was operating is an execution mode of the virtual machine monitor.

3. The method of claim 2, wherein a first execution mode is an emulation mode and a second execution mode is a direct execution mode.

4. The method of claim 3, wherein the emulation mode is a binary translation mode.

5. The method of claim 3, wherein the attempted memory access is permitted if the operating state was the emulation mode and the attempted memory access was to either the first address space or the second address space, or if the operating state was the direct execution mode and the attempted memory access was to the second address space.

6. The method of claim 5, wherein the first address space is contained in one or more numbered memory regions and, if the operating state was the direct execution mode and the attempted memory access was to a first region of the first address space, the first region is switched to a different region number.

7. The method of claim 6, wherein a third execution mode is a monitor mode.

8. The method of claim 7, wherein the attempted memory access is permitted if the operating state was the monitor mode and the attempted memory access was to the first address space, and the attempted memory access is not permitted if the operating state was the monitor mode and the attempted memory access was to the second address space.

9. The method of claim 8, wherein the virtual machine has virtual physical memory which is mapped into the first address space.

10. The method of claim 1, wherein the address space identifier comprises one or more bits of a virtual address for the attempted memory access.

11. The method of claim 10, wherein the address space identifier specifies a region number.

12. The method of claim 1, wherein, if the attempted memory access is permitted and the attempted memory access was to the second address space but a translation for the attempted memory access is not found in the second page table, a context switch is performed and execution switches to a third routine, the third routine attempting to find a translation for a virtual address of the attempted memory access in a virtual TLB of the virtual machine.

13. The method of claim 12, wherein, if a translation for the virtual address of the attempted memory access is not found in the virtual TLB, a TLB Miss fault is forwarded to a guest operating system in the virtual machine.

14. A computer program embodied in a tangible, computer-readable medium, the computer program being executable in a virtual computer system, the virtual computer system comprising a virtual machine monitor having a first address space and a virtual machine having a second address space, the virtual machine monitor having an emulation mode that may access both the first and the second address spaces and a direct execution mode that may only access the second address space, the computer program performing a method for providing virtual address translations for both the emulation mode and the direct execution mode, the method comprising:
providing a first page table having translations for the first address space;
providing a second page table having translations for the second address space; and
in response to a TLB Miss fault, performing the following steps:
determining whether the virtual machine monitor was in the emulation mode or the direction execution mode when the TLB Miss fault occurred;
determining whether the TLB Miss fault resulted from an attempt to access the first address space or the second address space; and:
if the virtual machine monitor was in the emulation mode and the attempted access was to the first address space, obtaining the virtual address translation from the first page table;
if the virtual machine monitor was in the emulation mode and the attempted access was to the second address space, obtaining the virtual address translation from the second page table; or
if the virtual machine monitor was in the direct execution mode and the attempted access was to the second address space, obtaining the virtual address translation from the second page table.

15. The computer program of claim 14, wherein the steps of determining whether the virtual machine monitor was in the emulation mode or the direction execution mode, determining whether the attempted access was to the first address space or the second address space, and obtaining the virtual address translation from the first page table or the second page table are all performed within a single context in an interrupt handler.

16. The computer program of claim 14, wherein if the virtual machine monitor was in the direct execution mode and the attempted access was to the first address space, switching execution to a different routine that switches the first address space to a different region number.

17. The computer program of claim 14, further comprising providing a TLB for holding translations for both the first address space and the second address space, the TLB being checked for the virtual address translation before a TLB Miss fault is generated.

18. The computer program of claim 17, further comprising providing a page table walker for checking for the virtual address translation before a TLB Miss fault is generated, the page table walker being configured to check the second page table when the virtual machine monitor is in either the emulation mode or the direct execution mode.

19. The computer program of claim 18, in which the virtual machine monitor also has a monitor mode that may only access the first address space, the method further providing virtual address translations for the monitor mode, the method further comprising determining whether the virtual machine monitor was in the monitor mode when the TLB Miss fault occurred and, if the virtual machine monitor was in the monitor mode and the attempted access was to the first address space, obtaining the virtual address translation from the first page table.

20. A computer program embodied in a tangible, computer-readable medium, the computer program being executable in a virtual computer system, the virtual computer system comprising a system hardware, a virtual machine monitor and a virtual machine, the virtual computer system having at least a first operating state and a second operating state, the computer program performing a method for providing access to address translations for multiple virtual address spaces, the method comprising:
providing a first page table having address translations from a first virtual address space to a physical address space, the first virtual address space being used by software within the virtual machine monitor during the first operating state;
providing a second page table having address translations from a second virtual address space to the same physical address space, the second virtual address space being used by software within the virtual machine during the second operating state;
causing the system hardware to use the first page table during the first operating state and the second page table during the second operating state; and in response to an attempted memory access for which the system hardware does not find a translation for a virtual address:
  determining whether the virtual address for the attempted memory access is in the first virtual address space or the second virtual address space by referencing an address space identifier;
  determining whether the attempted memory access is permissible based on whether the attempted memory access is in the first virtual address space or the second virtual address space and based on the operating state of the virtual computer system; and
  if the attempted memory access is permissible, determining a translation for the virtual address by:
    if the virtual address is in the first virtual address space, using the first page table, or
    if the virtual address is in the second virtual address space, using the second page table.

21. The computer program of claim 20, wherein the address space identifier comprises one or more bits of the virtual address.

22. The computer program of claim 21, wherein the address space identifier specifies a region number.

23. The computer program of claim 20, wherein an attempted memory access for which the system hardware does not find a translation for the virtual address results in a TLB Miss fault.

24. The computer program of claim 23, the method further comprising, providing a TLB which is checked for an address translation for the attempted memory access prior to any TLB Miss fault, and inserting address translations for both the first and the second virtual address spaces into the TLB.

25. The computer program of claim 24, the method further comprising, providing a page table walker and configuring the page table walker to check the first page table during the first operating state and the second page table during the second operating state for an address translation for the attempted memory access prior to any TLB Miss fault.

26. The computer program of claim 20, wherein the steps of (a) determining whether the virtual address for the attempted memory access is in the first virtual address space or the second virtual address space, (b) determining whether the attempted memory access is permissible, and (c) if the attempted memory access is permissible, determining a translation for the virtual address are performed within a single context in a TLB Miss fault handler.

27. A computer program embodied in a tangible, computer-readable medium, the computer program being executable in a computer system, the computer system executing computer code that accesses both a first virtual address space and a second virtual address space, the computer system having at least a first operating state and a second operating state, the computer program performing a method for obtaining an address translation for an attempted memory access, the method comprising:
  obtaining an address space identifier which indicates whether the attempted memory access is to the first virtual address space or the second virtual address space, wherein the computer system has a first page table containing address translations from the first virtual address space to a physical address space and a second page table containing address translations from the second virtual address space to the same physical address space;
  determining whether the attempted memory access is permissible based on the operating state of the computer system and based on the virtual address space to which the attempted memory access is directed; and
  if the attempted memory access is to the first virtual address space and if the attempted memory access is permissible, obtaining the address translation from the first page table, or
  if the attempted memory access is to the second virtual address space and if the attempted memory access is permissible, obtaining the address translation from the second page table.

28. The computer program of claim 27, wherein the address space identifier comprises one or more bits of a virtual address for the attempted memory access.

29. The computer program of claim 28, wherein the address space identifier specifies a region number.

30. The computer program of claim 27, wherein the steps of obtaining an address space identifier which indicates whether the attempted memory access is to the first virtual address space or the second virtual address space and obtaining the address translation from either the first page table or the second page table are in response to a TLB Miss fault.

31. The computer program of claim 30, the method further comprising, providing a TLB that is checked for an address translation for the attempted memory access prior to any TLB Miss fault, and inserting address translations for both the first and the second virtual address spaces into the TLB.

32. The computer program of claim 31, the method further comprising, providing a page table walker and configuring the page table walker to check the second page table for an address translation for the attempted memory access prior to any TLB Miss fault.

33. The computer program of claim 27, wherein the method is performed within a single context in a TLB Miss fault handler.

34. The computer program of claim 27, wherein the computer system is a virtual computer system comprising a virtual machine monitor having the first virtual address space and a virtual machine having the second virtual address space.

35. A computer program embodied in a tangible, computer-readable medium, the computer program being executable in a virtual computer system, the virtual computer system comprising a virtual machine monitor having a first address space and a virtual machine having a second address space, the computer program performing a method for emulating a guest instruction in the virtual computer system, the method comprising:
  using one or more references to the first address space to retrieve one or more emulation instructions, wherein execution of the emulation instructions emulates the execution of the guest instruction;
  using one or more references to the second address space to retrieve one or more data for use with the emulation instructions;
  providing a first page table for translations for the first address space;
  providing a second page table for translations for the second address space; and
  in response to an attempted memory access, using an address space identifier to determine if the attempted memory access was to the first address space or to the second address space, and, if the attempted memory access was to the first address space, using the first page table to obtain a translation for the attempted memory access, or, if the attempted memory access was to the second address space, using the second page table to obtain a translation for the attempted memory access.

36. The computer program of claim 35, wherein the guest instruction is emulated using binary translation techniques.

37. The computer program of claim 35, wherein the address space identifier comprises one or more bits of a virtual address for the attempted memory access.

38. The computer program of claim 37, wherein the address space identifier specifies a region number.

39. The computer program of claim 35, wherein the steps of using an address space identifier to determine if the attempted memory access was to the first address space or to the second address space, and, if the attempted memory access was to the first address space, using the first page table to obtain a translation for the attempted memory access, or, if the attempted memory access was to the second address space, using the second page table to obtain a translation for the attempted memory access are further in response to a TLB Miss fault.

40. The computer program of claim 39, the method further comprising, providing a TLB which is checked for a translation for the attempted memory access prior to any TLB Miss fault, and inserting translations for both the first and the second address spaces into the TLB.

41. The computer program of claim 40, the method further comprising, providing a page table walker and configuring the page table walker to check the second page table for a translation for the attempted memory access prior to any TLB Miss fault.

42. The computer program of claim 40, the method further comprising, providing a page table walker and configuring the page table walker to check the first page table for a translation for the attempted memory access prior to any TLB Miss fault.

* * * * *